United States Patent
Merrill et al.

(10) Patent No.: US 6,329,046 B1
(45) Date of Patent: Dec. 11, 2001

(54) OPTICAL FILM AND PROCESS FOR MANUFACTURE THEREOF

(75) Inventors: William W. Merrill, White Bear Lake; Richard C. Allen, Lilydale; Ronald J. Tabar, St. Paul; Peter D. Condo, Lake Elmo; Timothy J. Nevitt, Red Wing, all of MN (US)

(73) Assignee: 3M Innovative Properties, St. Paul, MN (US)

( * ) Notice: Subject to any disclaimer, the term of this patent is extended or adjusted under 35 U.S.C. 154(b) by 0 days.

(21) Appl. No.: 09/419,947

(22) Filed: Oct. 18, 1999

Related U.S. Application Data

(62) Division of application No. 09/006,455, filed on Jan. 13, 1998.

(51) Int. Cl.[7] ...................................................... B32B 7/02
(52) U.S. Cl. ........................... 428/212; 428/156; 428/170
(58) Field of Search ......................................... 428/212, 156, 428/170; 264/1.9, 230; 429/131, 133; 528/348, 331, 345, 363

(56) References Cited

U.S. PATENT DOCUMENTS

| | | | |
|---|---|---|---|
| 2,158,130 | 5/1939 | Land | ......................................... 88/65 |
| 2,997,390 | 8/1961 | Land | ......................................... 96/29 |
| 3,124,639 | 3/1964 | Kahn | ......................................... 88/65 |
| 3,610,729 | 10/1971 | Rogers | ................................. 350/157 |
| 3,711,176 | 1/1973 | Alfrey, Jr. et al. | ....................... 350/1 |
| 3,860,036 | 1/1975 | Newman, Jr. | ........................... 138/45 |
| 4,446,305 | * 5/1984 | Rogers et al. | . |

(List continued on next page.)

FOREIGN PATENT DOCUMENTS

| | | | | |
|---|---|---|---|---|
| 488 544 | 11/1991 | (EP) | ................................ | G02B/5/30 |
| 719 742 | 7/1996 | (EP) | ................................ | C03C/14/00 |
| WO 95/27919 | 4/1995 | (WO) | ................................ | G02B/27/28 |
| WO 95/17303 | 6/1995 | (WO) | ................................ | B32B/7/02 |
| WO 95/17691 | 6/1995 | (WO) | ................................ | G02B/5/30 |
| WO 95/17692 | 6/1995 | (WO) | ................................ | G02B/5/30 |
| WO 95/17699 | 6/1995 | (WO) | ................................ | G02F/1/1335 |
| WO 96/19347 | 6/1996 | (WO) | ................................ | B32B/7/02 |
| WO 97/01440 | 1/1997 | (WO) | ................................ | B32B/27/36 |
| WO 97/01774 | 1/1997 | (WO) | ................................ | G02B/1/10 |
| WO 97/01778 | 1/1997 | (WO) | ................................ | G02B/5/28 |
| WO 97/32226 | 9/1997 | (WO) | ................................ | G02B/5/30 |

OTHER PUBLICATIONS

Schrenk et al., Nanolayer polymeric optical films, Tappi Journal, pp. 169–174, Jun. 1992.

Primary Examiner—Merrick Dixon
(74) Attorney, Agent, or Firm—William D. Miller

(57) ABSTRACT

Optical films and processes for forming the optical films are described in which materials having different properties are used and the different properties are exploited to obtain improved optical and/or mechanical properties of the optical film. The different properties of the materials may be used to select processing conditions under which the materials will react differently. The film may be processed with respect to two different directions with the amount of molecular orientation, if any, induced by the process being separately controlled for each material and each direction.

8 Claims, 10 Drawing Sheets

U.S. PATENT DOCUMENTS

| | | | |
|---|---|---|---|
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,720,426 | 1/1988 | Englert et al. | 428/344 |
| 5,188,760 | 2/1993 | Hikmet et al. | 252/299.01 |
| 5,211,878 | 5/1993 | Reiffenrath et al. | 252/299.63 |
| 5,235,443 | 8/1993 | Barnik et al. | 359/37 |
| 5,269,995 | 12/1993 | Ramanathan et al. | 264/171 |
| 5,294,657 | 3/1994 | Melendy et al. | 524/270 |
| 5,316,703 | 5/1994 | Schrenk | 264/1.3 |
| 5,319,478 | 6/1994 | Fijnfschilling et al. | 359/53 |
| 5,389,324 * | 2/1995 | Lewis et al. | |
| 5,448,404 * | 9/1995 | Schrenk et al. | |
| 5,486,935 | 1/1996 | Kalmanash | 359/37 |
| 5,486,949 | 1/1996 | Schrenk et al. | 359/498 |
| 5,612,820 | 3/1997 | Schrenk et al. | 359/498 |
| 5,629,055 | 5/1997 | Revol et al. | 428/1 |
| 5,686,979 | 11/1997 | Weber et al. | 349/96 |
| 5,699,188 | 12/1997 | Gilbert et al. | 359/584 |
| 5,721,603 | 2/1998 | De Van et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,783,283 | 7/1998 | Klein et al. | 428/141 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |
| 5,882,774 | 3/1999 | Jonza et al. | 428/212 |
| 5,940,149 | 8/1999 | Vanderwerf | 349/5 |
| 5,962,114 | 10/1999 | Jonza et al. | 428/212 |
| 5,965,247 | 10/1999 | Jonza et al. | 428/212 |

* cited by examiner

OPTICAL FILM AND PROCESS FOR MANUFACTURE THEREOF

This is a divisional of application Ser. No. 09/006,455 filed Jan. 13, 1998.

BACKGROUND

This invention relates generally to an optical film and a process for manufacture thereof, and more particularly to processes in which the properties of materials in the film are exploited to control the response of the materials during processing.

Over the past several years the use of polymeric films to produce high-quality optical films has been explored. The investigated polymeric optical films typically exploit differing indices of refraction between layers of a multilayer film. For example, a multilayer optical film may be constructed by alternating polymer layers having high indices of refraction with polymer layers having low indices of refraction. Where two adjacent layers are formed with a relatively large mismatch between the respective indices of refraction, light of a particular wavelength is reflected at the interface of the two layers. The wavelength of light reflected is dependent on the optical thickness of the adjacent layers. Optical films may also be made of polymeric blends exploiting relative refractive indices relationships of different phases of the blend.

One type of multilayer optical film uses birefringent polymers to produce the mismatch between adjacent indices of refraction. In such films, the multilayer film is drawn either uniaxially in a direction along only one in-plane axis of the film or biaxially in a direction along two in-plane orthogonal axes of the film. As a result of drawing, molecules within one of the two adjacent layers become oriented in the direction of the draw. The molecular orientation alters the index of refraction of the affected layer in the draw direction.

Drawing a multilayer film, where one of the layers of the film is birefringent, can be used to obtain a mismatch of refractive indices of two adjacent layers in the draw direction. If the refractive indices of the two layers in the non-drawn in-plane direction match, the multilayer film may be used to reflect light of one polarization and transmit light of another. Such a film may be employed, for example, as a reflective polarizer. If a multilayer film is drawn such that the affected layer is oriented in the direction of two orthogonal in-plane axes, a mismatch in both directions may be obtained. Such a film may be used to reflect light of both polarizations (e.g., a mirror for the respective wavelength of light).

As noted above, one or more of the materials used in polymeric optical films has optical characteristics which change as the material is drawn. These characteristics tend to assume a directional orientation which depends on the direction in which the material is drawn. Such optical films may be described in terms of three mutually orthogonal axes, namely, two in-plane axes x and y and a thickness axis z. The optical properties of such optical films depend generally on the indices of refraction $n_x$, $n_y$ and $n_z$ of each material in the direction of the x, y and z axes, respectively. Thus, it is desirable to process the optical film in a manner which permits precise control over the optical properties of the materials used.

SUMMARY

Generally, the present invention relates to optical films and processes for manufacture thereof. In accordance with one embodiment of the invention an optical film, including at least a first and second material, is made by processing the film with respect to first and second in-plane axes of the film under conditions which induce optical-orientation in at least the first material along the first in-plane axis of the film while inducing orientation in the first material along the second in-plane axis of the film which is substantially less than the orientation induced along the first axis. The refractive index of the second material substantially matches the refractive index of the first material along one of the first and second in-plane axes of the film.

The process may be used to make films having improved optical and/or mechanical performance. The process may be used to make a number of different films. Two or more materials of the film may form alternating layers in a multilayer optical film. The two materials may also be formed in a blend film, for example, as a continuous phase and a disperse phase of material. In accordance with one embodiment of the invention, various combinations of orientation states of the two materials may be obtained by controlling the response of the materials to draw processing conditions.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

DETAILED DESCRIPTION

The present invention is applicable generally to a number of different optical films, materials and processes. The present invention is believed to be particularly suited to fabrication of polymeric optical films where the visco-elastic characteristics of materials used in the film are exploited to control the amount, if any, of molecular orientation induced in the materials when the film is drawn during processing. As described below, consideration of the various properties of the materials used to produce optical films may be exploited to improve the optical films. The improvements include one or more of improved optical performance, increased resistance to fracture or tear, enhanced dimensional stability, better processability and the like. While the present invention is not so limited, an appreciation of various aspects of the invention is gained through a discussion of the various examples below.

Figure 1A:
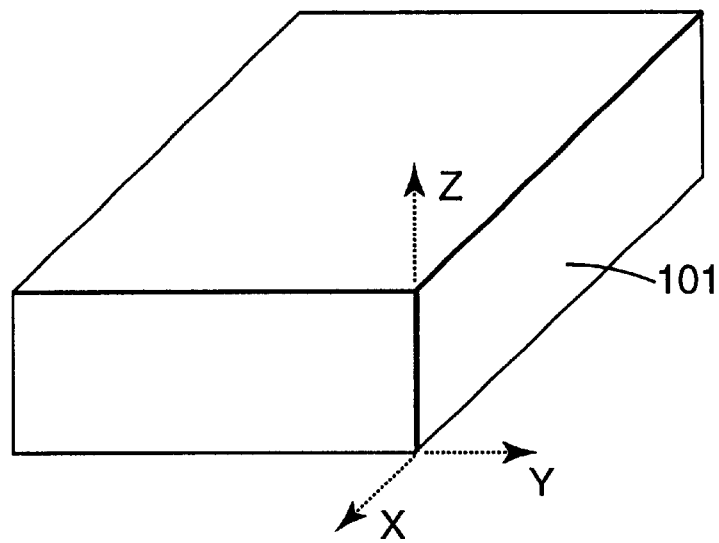
FIGS. 1A and 1B illustrate optical films in accordance with various embodiments of the present invention.

A process for fabricating an optical film in accordance with one particular embodiment of the present invention will be described with reference to FIG. 1. FIG. 1 illustrates a portion of an optical film 101. The depicted optical film 101 may be described with reference to three mutually orthogonal axes x, y and z. In the illustrated embodiment, two orthogonal axes x and y are in the plane of the film 101 (in-plane axes) and a third axis extends in the direction of the film thickness.

The optical film 101 includes at least two different materials which are optically interfaced (e.g., two materials which combine to cause an optical effect such as reflection, scattering, transmission, etc.). The properties of the two materials may be used to produce a desired mismatch of refractive indices in a direction along at least one axis of the film 101. Generally the two materials are visco-elastic in nature. At least one of the materials is subject to birefringence under certain conditions. The present invention is particularly suited to films comprised of materials which may be coextruded. Coextruded multilayer and polymeric blend films, for example, are well suited for fabrication of such a film. When the film 101 is comprised of coextruded materials, the materials must have sufficiently similar rheology (e.g., visco-elasticity) to meet the requirements of the coextrusion process. However, as described below, the visco-elastic properties of the film may also be different enough that the two different materials will respond differently to selected processing conditions.

During processing, the film 101 is drawn in at least two directions. In the description below, the term draw is used in connection with examples in which the film is stretched or extended. It should be appreciated that strain can also be introduced by compression. Generally the draw process can be of either type. The draw process may be used to selectively induce molecular orientation in one or more of the materials. The induced molecular orientation may be used, for example, to change the refractive index of an affected material in the direction of the draw, to alter the mechanical properties of the film, or the like. The amount of molecular orientation induced by the draw can be controlled based on the desired properties of the film, as described more fully below.

In accordance with one embodiment of the invention, an optical film is formed using two or more different materials. Under certain conditions only one of the materials substantially orients during the draw. Under other conditions the other or both materials are substantially oriented by the draw process. When the orientation causes a match of the refractive indices of the two materials in one in-plane direction and a substantial mismatch of the refractive indices in the other in-plane direction, the film is especially suited for fabricating an optical polarizing film. Using the process, a polarizing film may be made by drawing the film in the direction of both orthogonal in-plane axes in a manner which produces a substantial refractive index mismatch in the direction of only one in-plane axis.

In accordance with various embodiments of the invention, optical films can be constructed where the refractive indices along one in-plane axis are substantially equal while the refractive indices along the other in-plane axis are substantially mismatched. The matched direction forms a transmission (pass) direction for the polarizer and the mismatched direction forms a reflection (block) direction. Generally, the larger the mismatch in refractive indices in the reflection direction and the closer the match in the transmission direction the better the performance of the polarizer. Additionally, the refractive indices of the two materials in the thickness direction can be controlled (e.g. matched) to improve the optical performance of the optical film.

It will be appreciated that the refractive index in a material is a function of wavelength (i.e., materials typically exhibit dispersion). Therefore, the optical requirements on refractive index are also a function of wavelength. The index ratio of two optically interfaced materials can be used to calculate the reflective power of the two materials. The absolute value of the index difference between the two materials divided by the average index of those materials is descriptive of the film's optical performance. This will be called the normalized index difference. It is generally desirable that the normalized difference, if any, in matched in-plane refractive indices be less than about 0.05, more preferably less than about 0.02, and most preferably less than about 0.01. Similarly, it can be desirable that any normalized difference in refractive indices in the thickness direction of a polarizing film be less than about 0.09, more preferably less than about 0.04, and most preferably less than about 0.02. In certain instances it may desirable to have a controlled mismatch in the thickness direction of two adjacent materials in a multilayer stack. The influence of the z-axis refractive indices of two materials in a multilayer film on the optical performance of such a film are described more fully in U.S. patent application Ser. No. 08/402,041, filed Mar. 10, 1995, and entitled Optical Film, the contents of which are incorporated herein by reference.

In the mismatched in-plane direction of a polarizer, it is generally desirable that the normalized difference in refractive indices be at least about 0.06, more preferably greater than about 0.09, and most preferably greater than about 0.11. More generally, it is desirable to have this difference be as large as possible without significantly degrading other aspects of the optical film. In accordance with several embodiments of the invention, using multilayer pairs, the optical thickness of each layer in a layer pair should be equal in order to optimize the first order reflection. Here the optical thickness is the product of the physical layer thickness and the refractive index at a given wavelength. In other embodiments, higher order reflection peaks are desired and unequal optical thicknesses that optimize these reflections may be used.

In accordance with one embodiment of the invention, different visco-elasticity characteristics of two coextruded polymeric materials are used to fabricate an improved optical film. Visco-elasticity is a fundamental characteristic of polymers. The visco-elasticity characteristics of a polymer may be used to describe its tendency to react to strain like a viscous liquid or an elastic solid. At high temperatures and/or low strain rates, polymers tend to flow when drawn like a viscous liquid with little or no molecular orientation. At low temperatures and/or high strain rates, polymers tend to draw elastically like solids with concomitant molecular orientation. A low temperature process is typically near the glass transition temperature of amorphous polymeric materials while a high temperature process is usually substantially above the glass temperature.

Visco-elastic behavior of polymers is generally the result of the rate of molecular relaxation in the polymeric material. The rate of molecular relaxation can be characterized by an average longest overall relaxation time (i.e., overall molecular rearrangement) or a distribution of such times. The average longest relaxation time typically increases with decreasing temperature and approaches a very large value near the glass transition temperature. The average longest relaxation time can also be increased by crystallization and/or crosslinking in the polymeric material which, for practical purposes, inhibits any relaxation of this longest mode under process times and temperatures typically used. Molecular weight and distribution as well as chemical composition and structure (e.g., branching) can also effect the longest relaxation time.

When the average longest relaxation time of a particular polymeric material is about equal to or longer than the process draw time, substantial molecular orientation will occur in the material in the direction of the draw. Thus, high and low strain rates correspond to processes which draw the material over a period of time which is less than or greater than the average longest relaxation time, respectively. It will be appreciated that the response of a given material can be altered by controlling the draw temperature, draw rate and draw ratio of the process.

In accordance with one aspect of the invention, the extent of orientation during a draw process can be precisely controlled over a broad range. In certain draw processes, it is possible that the draw process actually reduces the amount of molecular orientation in at least one direction of the film. For example, the film may be stretched in one direction while allowing the film to dimensionally relax in the transverse direction. This process may reduce an initial molecular orientation in the transverse direction. Thus, the process may be a negative orienting process. In the direction of the draw, the molecular orientation induced by the draw process ranges from substantially no orientation, to slight non-optical orientation (e.g., an orientation which produces negligible effects on the optical performance of the film), to varying degrees of optical orientation.

The relative strength of optical orientation depends on the material and the relative refractive indices of the film. For example, strong optical orientation may be in relation to the total intrinsic (normalized) birefringence of the given materials. Alternatively, the draw strength may be in relation to the total amount of achievable normalized index difference between the materials for a given draw process sequence. It should also be appreciated that a specified amount of molecular orientation in one context may be strong optical orientation and in another context may be considered weak or non-optical orientation. For example, a certain amount of birefringence along a first in-plane axis may be negligible when viewed in the context of a very large birefringence along the second in-plane axis. As the birefringence along the second in-plane axis decreases, the slight orientation along the first in-plane axis becomes more optically dominate. Processes which occur in a short enough time and/or at a cold enough temperature to induce some or substantial optical molecular orientation are weak or strong optically orienting draw processes, respectively. Processes which occur over a long enough period and/or at hot enough temperatures such that little or no molecular orientation occurs are non-optically orienting or non-orienting processes, respectively.

By selecting the materials and process conditions in consideration of the orienting/non-orienting response of the materials to the process conditions, the amount of orientation, if any, along the axis of each draw process may be separately controlled for each material. Thus, a resulting film may be constructed in which each material has different types of the above described molecular orientations along each axis. For example, a film can be produced having one material which is optically oriented along a first in-plane axis, either strongly or weakly, with non-optical or no orientation along a second in-plane axis and a second material which is biaxially optically oriented (e.g. optically oriented along both in-plane axes). The biaxial optical-orientation, for example, may be symmetric (e.g., both strongly or weakly optically oriented) or asymmetric (e.g., strongly optically oriented in one direction and weakly optically oriented in the other direction). In certain processes only one of the materials may have an optical orientation.

The amount of molecular orientation induced by a particular draw process does not by itself necessarily dictate the resulting film's molecular orientation. A certain amount of orientation in a first draw process may be permitted for one material in order to compensate for or assist with further molecular orientation in a second draw process. For example, a first draw process may be strongly optically orienting for the first material and non-optically orienting for the second material. A second draw process may be used which is weakly optically orienting for the first material and strongly optically orienting for the second material (e.g., resulting from the first draw process molecular orientation induced nucleation of the second material). In this case, the orientation induced in the first material by the first draw process is greater than the orientation induced in the first material by the second draw process. In this example, the first material in the resultant film has a strong optical-orientation in the direction of the first draw while the second material has a strong optical-orientation in the direction of the second draw.

In still another example, the visco-elastic characteristics of the individual materials used in the optical film can be exploited by multiple draw processes to produce a film in which one of the component materials is optically oriented biaxially (symmetric or asymmetric) while another component material has been optically oriented in only one direction (uniaxially). Such an optical film may be produced by selecting the conditions of a first draw process to be optically orienting for one material and non-orienting (or non-optically orienting) for a second material. Conditions for a second draw process may be selected to be optically orienting for both materials. The results would be a film in which the first material has been optically oriented in only the second direction while the second material has been optically oriented in both the first and second direction. Various advantages of such processes are exemplified in the various embodiments, examples and processes provided below.

Figure 2A:
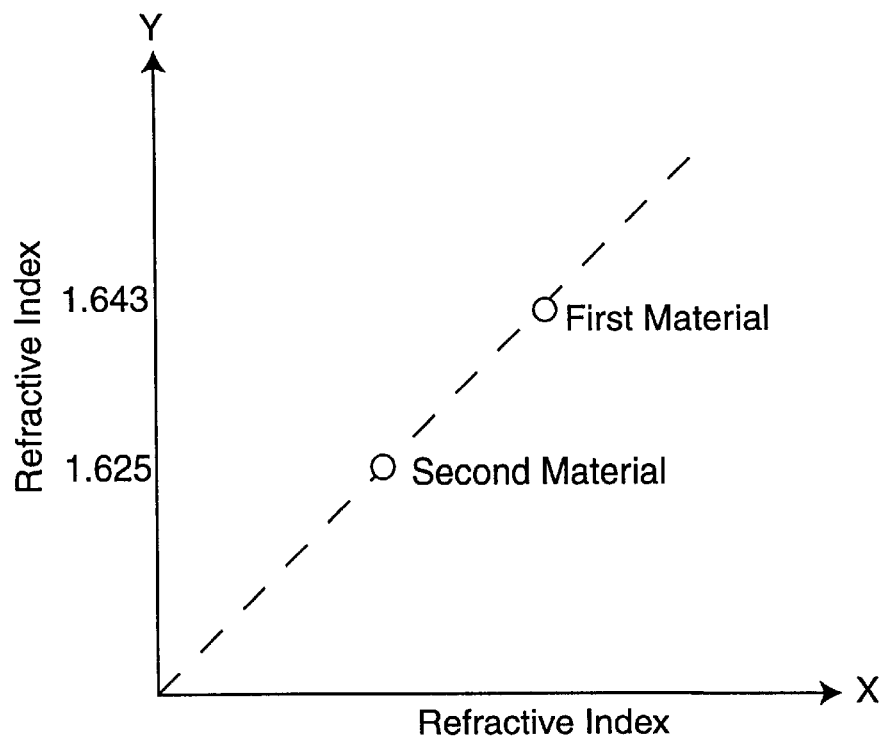
FIGS. 2A–2J illustrate diagrams of various processes in accordance with the present invention.

The flexibility and breadth of the various possible material and process embodiments can be understood by the construction of orientation diagrams developed for this purpose. These diagrams can be used to depict the state of optical orientation of the various materials after a desired number of process steps. Orientation diagrams are constructed as follows. First, a set of axes are drawn depicting the in-plane indices of the materials. As indices are always positive, only a first quadrant is required for the diagram. The indices in the first in-plane (draw) direction may be represented by the y axis and the indices in the second in-plane (draw) direction may be represented by the x axis. A 45° diagonal line extending between the two axes represents the possible in-plane isotropic states. In a typical process, the materials used in the optical film may initially be isotropic and can be represented by points on this line. In some cases, materials may begin in a state of orientation. In many of these cases, a previous process step, e.g. a casting step, may be the source of this orientation (and diagramming may begin at this prior step). The orientation diagram represents orientation states of the materials. FIG. 2A, for example, is an orientation diagram which illustrates the case of two initially isotropic polymers with isotropic indices of 1.625 and 1.643 at 632.8 nm (e.g., the polyesters coPEN comprising 70% PEN and 30% PET subunits, and the homopolymer PEN).

The possible process steps include, but are not limited to, drawing the film in one direction while holding the other in-plane direction essentially constant (e.g., drawing in a conventional tenter), drawing in one direction while allowing the other in-plane direction to relax dimensionally (e.g., drawing in a conventional length orienter), or drawing simultaneously in both directions either equally or unequally (e.g., drawing in a simultaneous, biaxial tenter). Various process permutations or combinations of these processes can be used (e.g., LO/tenter, tenter/LO., Biax tenter/LO, compression, etc.).

Figure 2B:
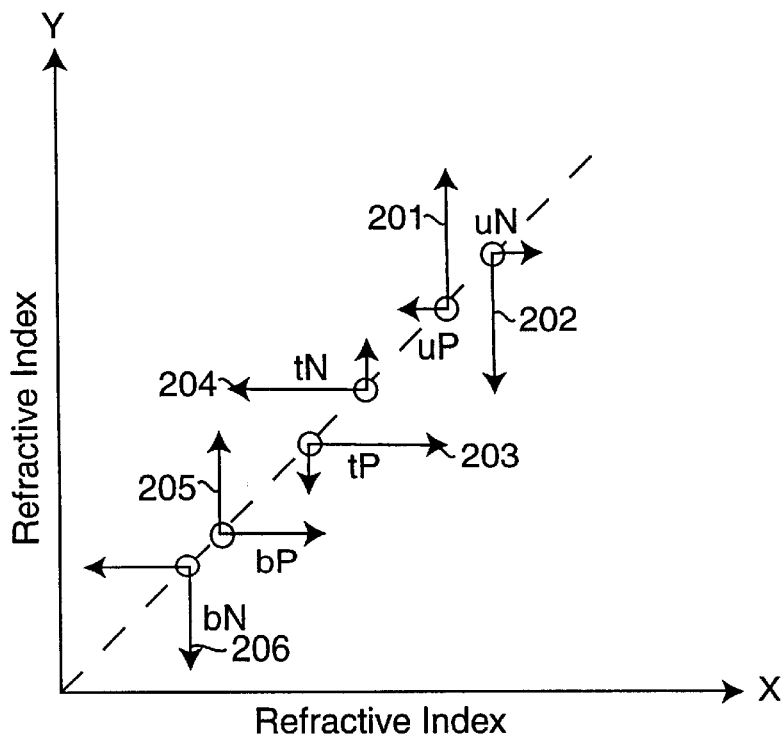
Figure 2C:
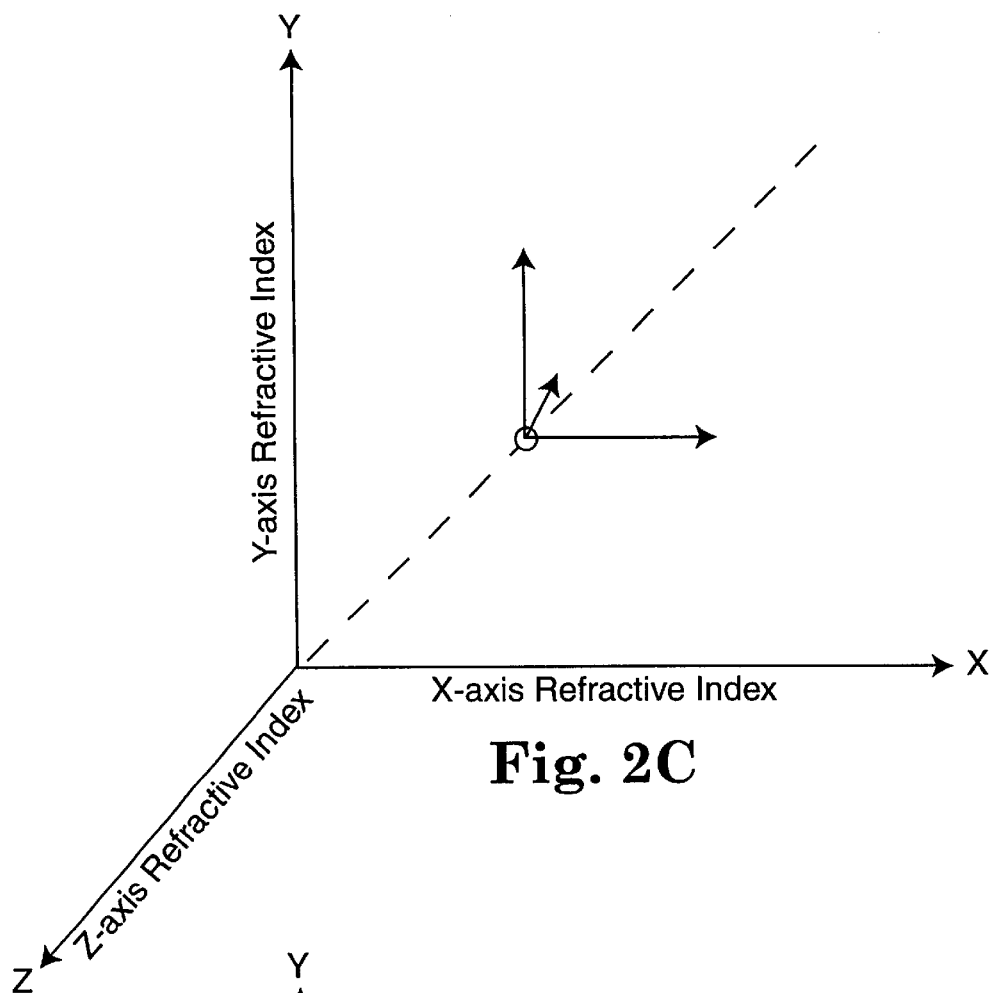

After any number of given steps, the materials may be found in any of a variety of orientational states, including being uniaxially oriented in the first draw direction (u), uniaxially (transversely) oriented in the second draw direction (t), or biaxially oriented in-plane (b) (in-plane, because uniaxial compression in the out-of-plane thickness direction is a form of biaxial extension in-plane). Other orientation processes are possible For example, an out-of-plane uniaxial extension would appear in-plane as a biaxial compression, i.e. a biaxial extension in reverse. A material may be either positively birefringent (P) so that the index of that material increases in the draw direction or negatively birefringent (N) so that the index of that material decreases in the draw direction. FIG. 2B illustrates a variety of the various material states including a uniaxially oriented positively birefringent material 201 (uP), a transversely uniaxially oriented positively birefringent material 203 (tP), a biaxially oriented positively birefringent material 205 (bP), and the negatively birefringent analogues 202, 204, 206 (uN, tN and bN) respectively. The direction in which the refractive indices match can be designated with separate numerals indicating different draw axes. In FIG. 2B biaxial states assume the general shape of $1^{st}$ and $3^{rd}$ quadrant figures while uniaxial states (both u and t) have the shape of $2^{nd}$ and $4^{th}$ quadrant figures. The lengths of the legs on a material state diagram represent the changes in index from the equivalent isotropic state and the vertex of the figures are that of equivalent isotropic states. As a first approximation, the equivalent isotropic state is the index state of the initial isotropic materials. A plus or minus sign (+/−) may be used at the vertex to indicate the sign change in the thickness or z index from the equivalent isotropic state. Three dimensional orientation diagrams may also be used to depict the z index explicitly as in FIG. 2C. Finally, in the transition between a uniaxial and biaxial draw, the second leg may be reduced to the vertex, reducing the diagram to a single leg in the principle draw direction.

Figure 2D:
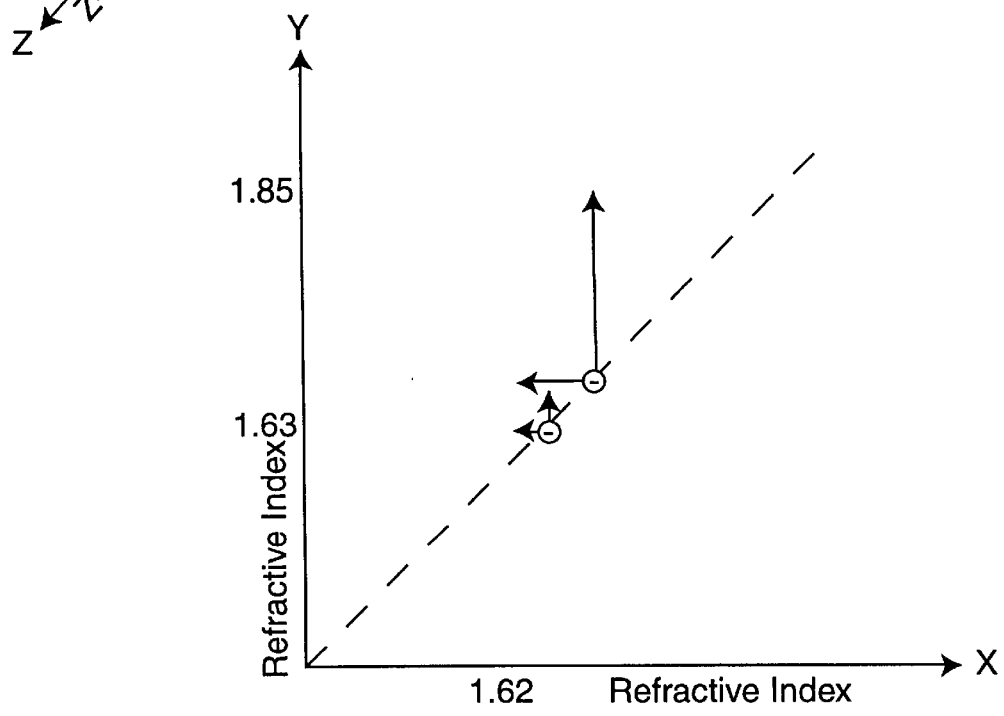
Figure 2E:
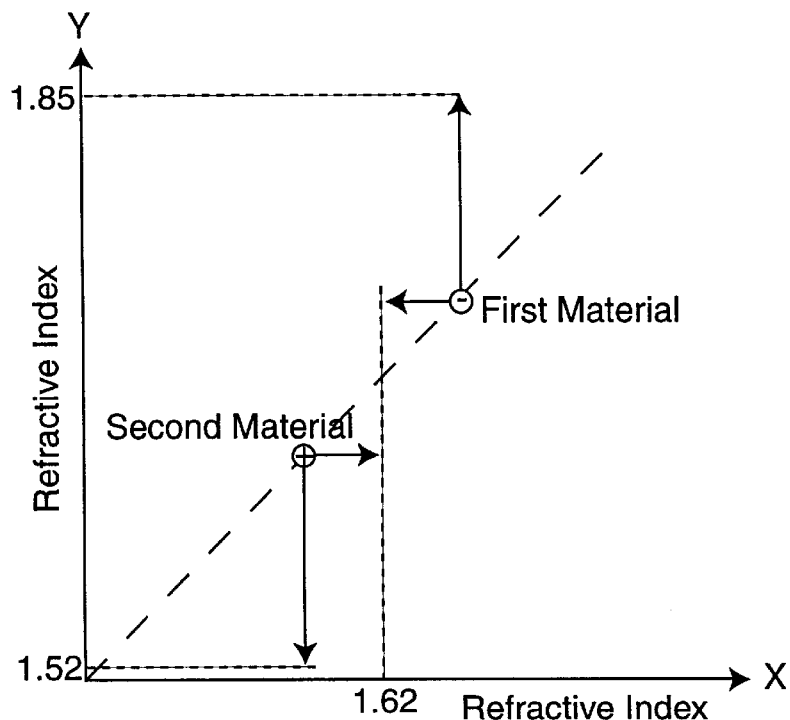

The orientation diagrams can be used to pictorially represent optical films which result from various process choices. With suitable materials, any combination of two orientation states can be combined to produce a final article. Various examples are provided below to illustrate combinations of different orientation states. The invention, however, should not be considered limited to the provided examples. The orientation diagram of FIG. 2D illustrates the case of a uniaxial draw of the materials having the isotropic states depicted in FIG. 2A, resulting in a uP-uP-2 orientation diagram with draw conditions and materials selected to produce a polarizer. FIG. 2E illustrates the case of a uniaxial draw of a positively and negatively birefringent material pair in the case of a uniaxial draw, resulting in a uP-uN-2 orientation diagram (e.g., PEN and syndiotactic polystyrene). In these cases, the orientation diagrams are designated first by the material with the highest equivalent isotropic state, second by the material with the lower equivalent isotropic state and finally by the direction matching, here the second or non-drawn in-plane direction. Other matching designations include "1" for matching in the first drawn in-plane direction, and "0" for no matching in an in-plane direction. A second matching designator of "+", "−" or "0" may be appended to specify the condition (matching or difference)in the out-of-plane first and second material z indices. In both cases depicted (in FIGS. 2D and 2E), the result is a polarizer with transmission (pass) axis along the x-axis direction and reflection (block) axis along the y-axis.

Figure 2F:
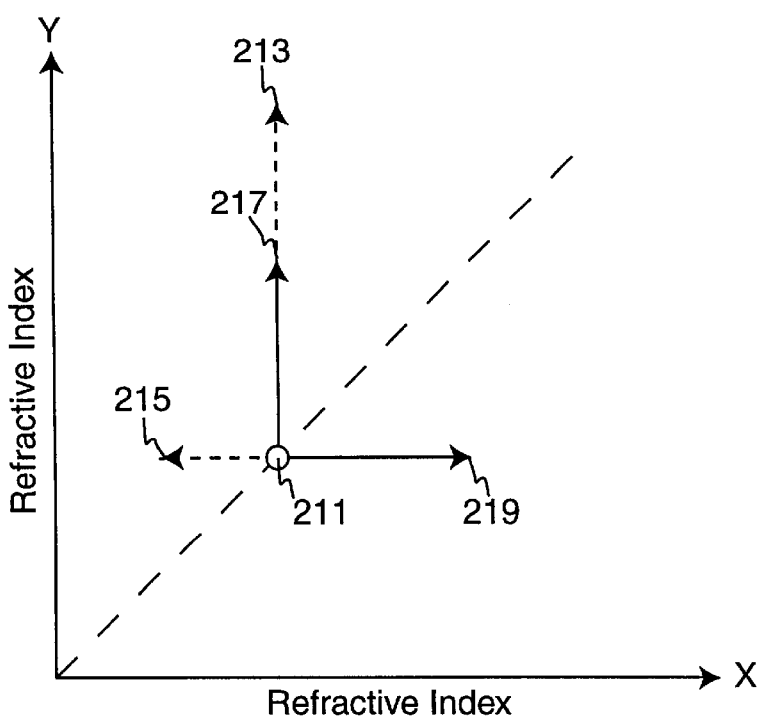

Given an orientation diagram, the qualitative effect of a process can be discerned. Drawing a positively birefringent material increases the positive length of the orientation diagram in the draw direction. If no other material orienting processes are operative during draw (e.g., crystallization or other phase transitions), then a uniaxial draw tends to maintain or decrease the positive length of the orientation diagram in the non-drawn direction and z direction. Since a biaxial draw tends to increase both in-plane directions, the z index tends to decrease as long as the equivalent isotropic state remains constant (e.g., no densification due to crystallization). The opposite changes occur for negatively birefringent materials. For example, FIG. 2F shows how a positively birefringent material having an isotropic index 211 may respond to a two-step biaxial draw process. The material is first drawn in the direction of the y-axis. After the first draw the material exhibits a uniaxial orientation state with in-plane refractive indices 213 and 215. When the material is drawn in the direction of the x-axis, the refractive index along the first axis is decreased 217 and the material increases in refractive index along the x-axis 219. Using such a process with appropriate draw conditions it is possible to draw a material such that the net change in refractive indices along each of the x- and y-axes is substantially the same. Typically, in the absence of other orienting or densification processes, the z index would continue to decrease during each draw process.

Figure 2G:
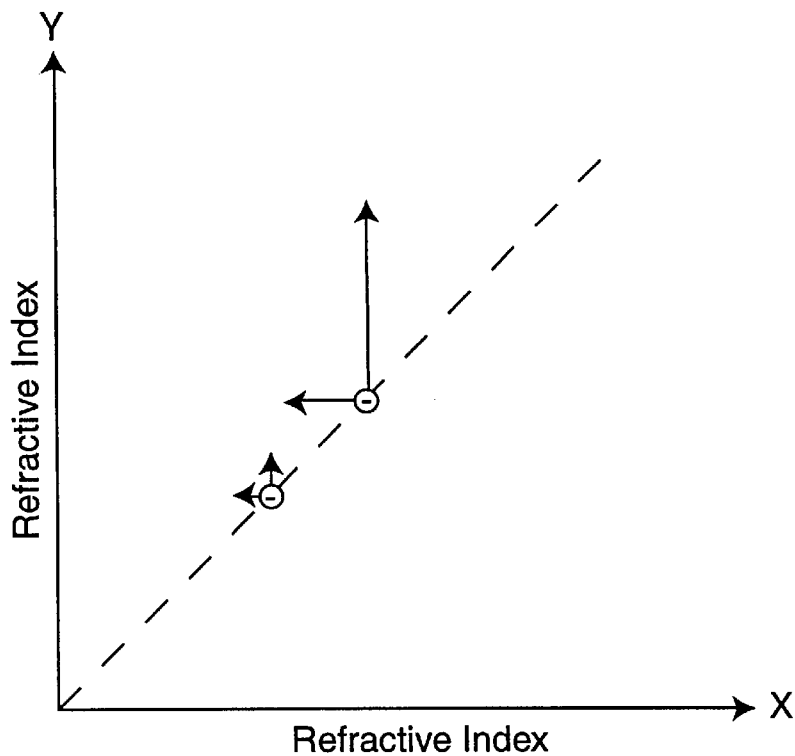
Figure 2H:
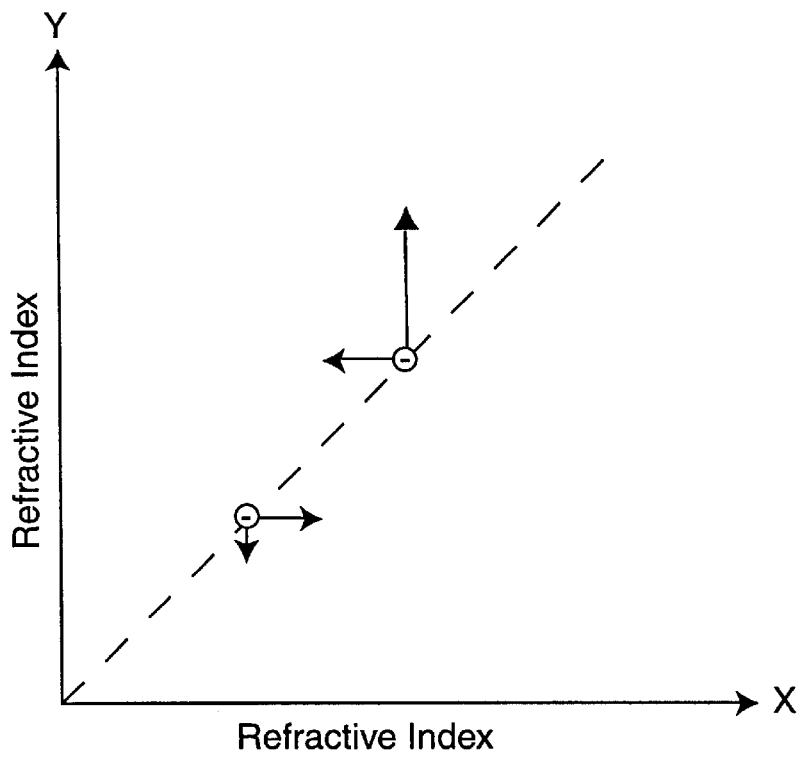
Figure 2I:
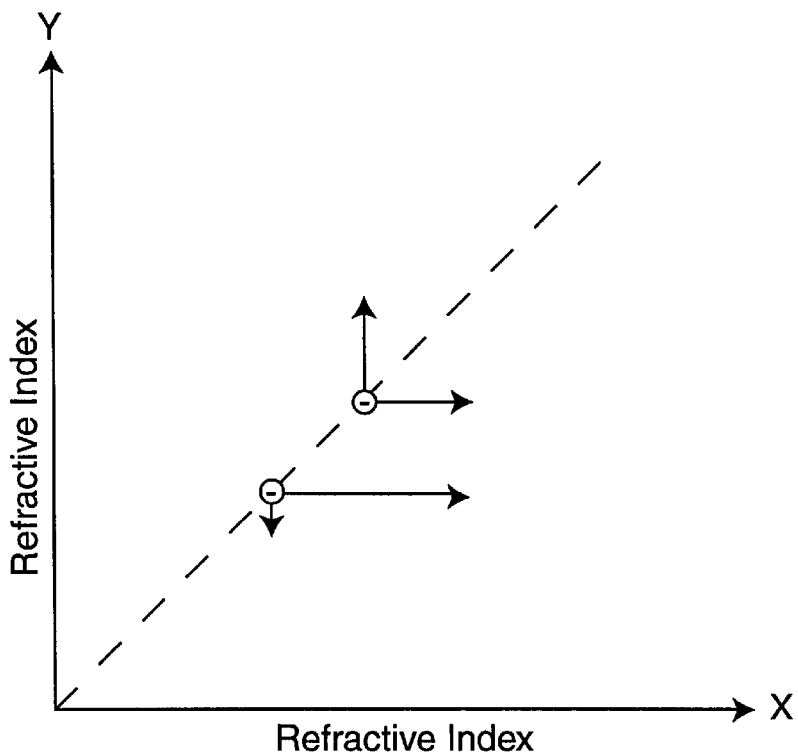

The effect of a multiple draw process on multiple materials is further illustrated with reference to FIGS. 2G–2I. FIG. 2G shows the orientation diagram for two positively birefringent materials after a first uniaxial draw. The result is a uP-uP-0 diagram in which the first material is strongly oriented and the second material is weakly oriented. FIG. 2H shows the progression during a draw in the second direction to a uP-tP-2 orientational state diagram. The latter case may be the desired final article (e.g. a polarizer with its transmission direction along the final draw direction). Finally, FIG. 2I shows the progression to a final bP-tP-2 orientation state. Again this results in a polarizer with its transmission direction along the final draw direction (x-axis). The first material is now strongly biaxially oriented while the second material is strongly uniaxially oriented.

Although the draw processes define the orientational changes in the materials to a first approximation, secondary processes such as densification or phase transitions such as crystallization can also influence the orientational characteristics. In the case of extreme material interaction (e.g. self-assembly, or liquid crystalline transitions), these effects may be over-riding. In typical cases, for example, a drawn polymer in which the main chain backbone of the polymer molecule tends to align with the flow, effects such as strain-induced crystallization, tend to have only a secondary effect on the character of the orientation. Strain-induced and other crystallization, does, however, have a significant effect on the strength of such orientation (e.g., may turn a weakly orienting draw into a strongly orienting draw).

Figure 2J:
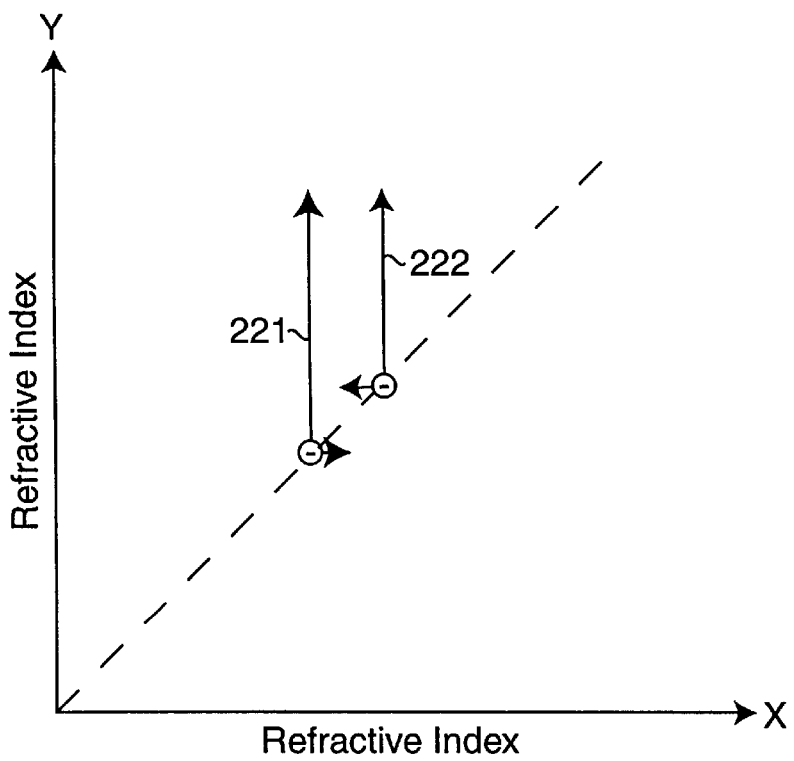

In general, densification as might accompany crystallization, tends to increase the average or equivalent isotropic index of refraction for a material. These effects are typically small but can obscure the nature of the orientational changes with processing. For example, a uniaxially oriented material, such as a polyester, may be heat set to increase crystallinity. This may increase the in-plane indices more than it decreases the z index. Compared to the amorphous isotropic index, the resulting indices may appear to suggest a conversion to biaxial orientation, whereas the real change is a shift in the equivalent isotropic state of the final semi-crystalline material. This is illustrated in FIG. 2J as a sliding of the material figure from a first position 221 up the isotropic line to a second position 222. The equivalent isotropic index of the final material can be estimated using the final indices in a variety of ways. For example, a simple average may be used. Alternatively, an anisotropic version of the Lorentz-Lorenz (Clausius-Mossetti) equation which assumes isotropic local fields and results in a conservation of polarizability may be used.

Crystallization and other transitions induced by the process can also provide additional orienting effects. For example, the refractive index of the non-drawn direction of many polyesters including PEN and PET does not vary monotonically during uniaxial draws that preferentially maintain the in-plane direction dimension over the thickness direction. It would appear that an ordering of the crystals may occur (due perhaps to geometrical considerations given the growth rates of the crystals and rotation of the anisotropic crystals under flow which results in a planarization of the aromatic rings). This would result in an increase of non-drawn in-plane index at the expense of the z index as is observed. Thus, this crystal ordering process can provide a low level of transverse orientation creating an unequal biaxial optical orientation during a uniaxial draw. Subsequent process steps such as heat setting that promote crystal growth can also be orienting processes due to the existing crystal order.

Figure 1B:
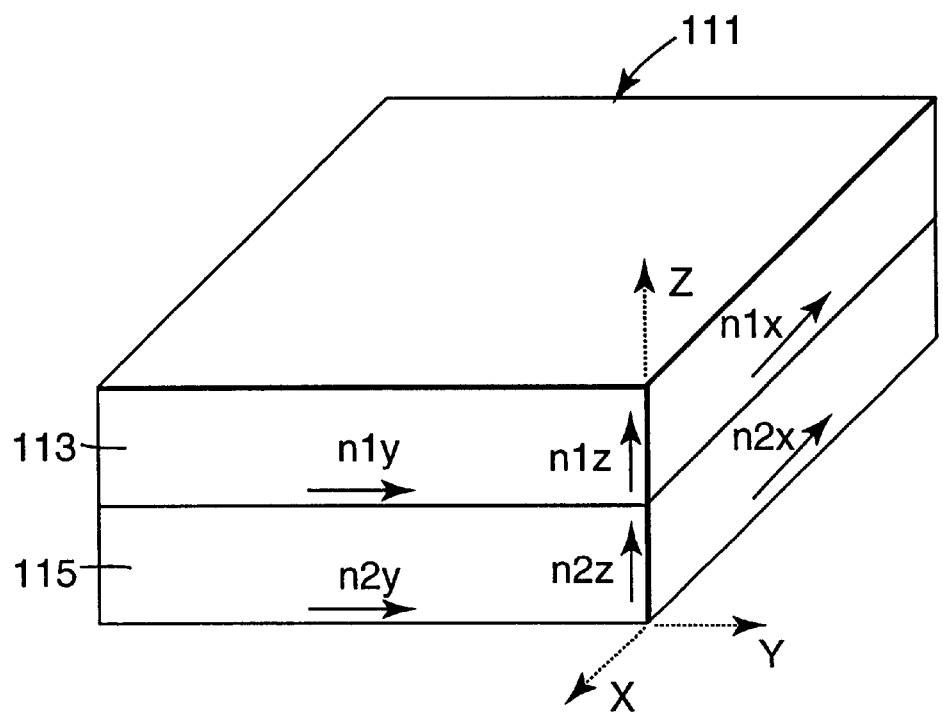

FIG. 1B illustrates a multilayer optical film 111 manufactured in accordance with an embodiment of the invention. The film 111 in FIG. 1B includes a first layer of birefringent material 113 coextruded with a second layer of birefringent material 115. While only two layers are illustrated in FIG. 1B and generally described herein, the process is applicable to multilayer optical films having hundreds or thousands of layers made from any number of different materials. A general discussion of multilayer optical films is provided in above referenced commonly assigned patent applications having Ser. No. 08/402,041.

The materials may be selected to have visco-elasticity characteristics so as to at least partially decouple the draw behavior of the two materials 113 and 115 in the film 111. By decoupling the draw behavior, changes in the refractive indices of the materials may be separately controlled to obtain various combinations of orientation states in the two different materials. In one such process, two different materials form adjacent layers of a coextruded multilayer film. The indices of refraction of the coextruded layers typically have an initial isotropy (i.e., the indices are the same along each axis) although some orientation during the casting process may be purposefully or incidentally introduced in the extruded film. In one exemplary embodiment, the film may be drawn in a first direction (e.g., in a direction along the y axis) under conditions which are optically orienting for one of the two materials and non-optically orienting or non-orienting for the other. In this manner, one of the materials assumes a molecular orientation in the direction of the first draw (e.g., y-axis) while the other material remains substantially isotropic. A second draw process may then be performed in a second direction (e.g., along the x-axis) under conditions selected to be optically orienting for both materials. In this example, one material has substantial molecular orientation in the second draw direction only (e.g., the x-axis) while the other material has substantial molecular orientation in both directions (e.g., x- and y-axes).

In the above process, greater flexibility is provided to control the refractive indices of the materials. As the material is drawn, the refractive index of the materials in the direction of the z-axis may also be affected. As a polymeric material is drawn in one direction, the approximate incompressibilty (volume conservation) of the drawn polymer may cause the material to dimensionally contract in one or both of the remaining two orthogonal directions. If the draw conditions constrain the dimensions in one direction more of the dimensional contraction will occur in the third direction. For example, if the polymeric film is drawn in the first direction using for example a conventional tenter, the manufacturing process essentially maintains the non-drawn, in-plane dimension fixed. This forces almost all dimensional reduction to occur in the thickness direction changing the z-axis refractive index. If the polymeric film is drawn in the first direction using for example a length orientor (e.g. consisting of rollers of differing speed), the manufacturing process may essentially maintain the non-drawn, in-plane dimension fixed or cause a contraction or neckdown of this direction. Using the above processes, the relative z-axes refractive index of the materials can also be tuned. The following discussion illustrates the advantages obtained by tuning the z-axis refractive indices.

One approach to forming a reflective polarizer uses a first birefringent material and a second non-birefringent material having an isotropic index of refraction which remains constant during the draw process. The second material is selected to have an isotropic refractive index which matches the non-drawn in-plane refractive index of the first material. In such a process, a mismatch of refractive indices of the two materials along the z-axis may be formed as a result of a change of the refractive index in the thickness direction of the orienting material. The importance of the z-axis in multi-layer films is described in the above referenced application Ser. No. 08/402,041.

In accordance with one embodiment of the invention, changes in the refractive index in the thickness direction (z-axis) are taken into consideration when selecting materials and processing conditions. By exploiting various properties of the materials, a mismatch in refractive indices of the two materials along the z-axis may be reduced or eliminated as desired. Moreover, decoupling the response of the two materials as the film is drawn permits tuning of the relative z-axis refractive indices as well as the in-plane refractive indices to desired levels.

In addition to enhanced optical properties, combining optically orienting and non-optically orienting (or non-orienting) draw processes can also be used to obtain improved mechanical properties of the formed film. When at least one material exhibits a biaxial molecular orientation, improved resistance to tear inception is obtained compared with a film which is drawn in only a single direction. Thus, in accordance with one particular embodiment of the present invention, at least one biaxially oriented material is provided in an optical polarizing film to improve the mechanical properties of the film. The improved mechanical properties include, for example, enhanced windability and converting of the polarizer film. The presence of biaxially oriented materials also tends to improve the toughness of the film, including resistance to tear initiation and propagation.

Biaxial orientation or crossed uniaxial orientation of at least some of the materials can also enhance dimensional stability, including thermal and hygroscopic expansion as well as shrinkage. Dimensional stability is often important in end use applications, e.g. in liquid crystal displays. Constraints on in-plane expansion, for example, can lead to out-of-plane warping or buckling that leads to diminished or lost utility of the display. A biaxially oriented polarizer in accordance with one embodiment of the present invention greatly reduces or eliminates this problem. It should also be noted that the directional characteristics of the various mechanical properties can be varied. For example, the direction of maximum tear resistance or maximum thermal expansion may be coincident or perpendicular to the final draw direction. In some cases, material selection and processing may be chosen to tailor these directions and magnitudes, for example by control of the composition and relative thicknesses of skin layers (and internal protective boundary layers of multilayer films) as well as by control of the orientation of the optical materials.

Improved mechanical properties may be imparted to an optical film by imparting biaxial characteristics to non-optical materials in the film (e.g., protective boundary layers, skin layers, facilitating layers, and the like). For example, a multilayer construction may be fabricated in which the alternating layers include a first birefringent material and a second non-birefringent isotropic material. The film may also include one or more orientable protective boundary or skin layers. Such a film may be processed with respect to a first direction under conditions which do not induce optical orientation in the first material of the optical layers but do orient the non-optical material in the direction of the first draw. The film may then be processed with respect to a second direction under conditions which orient the birefringent material of the optical layers and the non-optical material. The resulting film has adjacent layers of a uniaxial optically oriented birefringent material and an isotropic material forming the optical portion of the film and at least one biaxially oriented non-optical layer (e.g., protective boundary layers or skin layers).

Non-optical materials into which a biaxial orientation is induced may also be used in blend optical films. For example, one or more facilitating layers (described more fully below) may be biaxially oriented using a biaxial draw process, under draw conditions where at least an optical material of the blend is essentially uniaxially oriented. In one such construction, a five layer film may be made. The film may be of the form ABABA, where layers A are non-optical facilitating layers and layers B are optical blend layers. In such a film each facilitating layer may be of the same or different construction. Similarly, the various optical blend layers may be of the same or different construction. Such a film may be processed under conditions which biaxially orient one or more of the facilitating layers while uniaxially orienting at least one material in the blend layers. Various combinations of strong and weak biaxial orientation and uniaxial orientation can be obtained with in the different materials and layers.

As the above examples illustrate, in accordance with one aspect of the present invention, optical films can be made in which at least two different birefringent materials are used, one of which is incorporated into a non-optical portion of the film. The two materials can be coextruded into an optical film which is subsequently processed to obtain a desired optical performance. Such a coextruded film can be processed such that the birefringent material in the non-optical portion of the film is biaxially oriented while the birefringent material in the optical portion of the film is uniaxially oriented. In such films, improved mechanical properties may be obtained without significantly impacting the optical performance of the film.

The biaxial stretching of the film also permits greater freedom in material selection. In a conventional uniaxially stretched polarizer, one material is selected to have an isotropic refractive index which matches the non-stretched direction in the other (strain-induced birefringent) material. The refractive index of the drawn birefringent material may be quite high in certain instances limiting the number of materials available for use as the isotropic material. In contrast, because the film is biaxially stretched, two different strain-induced birefringent materials may be used. For example, a film having a lower isotropic refractive index can be used which when stretched has an in-plane refractive index which matches the non-oriented (non-optically oriented) in-plane refractive index of the other material. In other words, the in-plane refractive indices of one material may be raised to match the non-oriented in-plane refractive index of the other material (e.g., by allowing the refractive index in the thickness direction of the second birefringent to decrease as a result of the biaxial stretching process). In still another embodiment, a second material can be used which has in-plane refractive indices after drawing which match the highest index of the other material. It should be understood that while the refractive indices are described in connection with positively birefringent materials in various examples, the concepts described throughout the specification are also applicable to negatively birefringent materials (or combinations of positively and negatively birefringent materials).

As will be appreciated from the specific examples provided below, the particular materials used in a film which is biaxially drawn may be selected to permit heat setting of the film. The improved mechanical properties of the above-described films as well as the ability to heat set the film make the films particularly well suited for post processing operations such as coating and a variety of end-use functions. Heat setting the film may also improve the optical performance of many such films.

The biaxial stretching of the film not only permits greater freedom in material selection but also greater flexibility in controlling the disposition of the final article. In the typical case of a single draw step, the index of refraction of the second, isotropic material is matched to the lower index of the first, birefringent material. In the case of a first, positively birefringent material (i.e., a material that increases in index along the in-plane stretching direction with stretching), matching of the lower, second in-plane index perpendicular to draw results in a polarizer with polarization axis of maximum index difference and thus maximum reflection (the block state) in the direction of the single draw. It is possible using a single draw step to match the index of refraction of the second isotropic material to the higher index of the first, birefringent material. This can be accomplished, for example, using a polyester such as polyethylene terephthalate as the first, birefringent polymer and using polyvinyl naphthalene or poly vinyl carbazole, with indices about 1.68 at 632.8 nm, as the second isotropic polymer. In such a film, a polarizer may be constructed having its polarization axis of maximum index difference and thus maximum reflection (the block state) in the direction perpendicular to the single draw. While a single draw step can be used in accordance with the above aspect of the invention, the number of materials which can be used to make such a polarizer are limited (e.g., few isotropic materials having the needed high refractive index are suitable for optical films).

In an alternative single draw case using a first, negatively birefringent material, (e.g., a material that decreases in index along the in-plane stretching direction), matching of the now higher, second in-plane index perpendicular to draw with an isotropic material may be easier from a material selection standpoint. For example, syndiotactic polystyrene and a copolyester comprising naphthalate, terephthalate and isophthalate subunits can be used to achieve an isotropic index between 1.57 and 1.64 at 632.8 nm as the second isotropic polymer. This creates a polarizer with a transmission axis perpendicular to the draw direction. In order to make a polarizer with a transmission axis along the draw direction, different polymers must be chosen so that the low index of the negatively birefringent drawn polymer is matched. An isotropic polymer could be used. Alternatively, a higher isotropic index negatively birefringent material with a lower isotropic index positively birefringent material could be used by matching draw direction indices (e.g., by using syndiotactic polystyrene with various polyacrylates or polyolefins). Finally, these approaches require suitably negatively birefringent materials.

In accordance with another aspect of the invention, multiple draw processes may be used which control the process conditions to change the reflection and transmission axis. In accordance with one embodiment, the same materials (e.g. polyethylene naphthalate and polyethylene terephthalate) can be used in different biaxial, two step draw processes to form different multilayer optical films, one with its reflection axis co-linear to the second draw and the other with its reflection axis co-linear to the first draw. As more fully illustrated by the examples set forth below, because both materials can be strain induced birefringent materials, the in-plane refractive indices of a biaxially oriented second material can both be raised to match the high in-plane refractive index of the uniaxially optically oriented material. This approach provides greater flexibility in material selection and greater control over the reflection and transmission axis.

Figure 3:
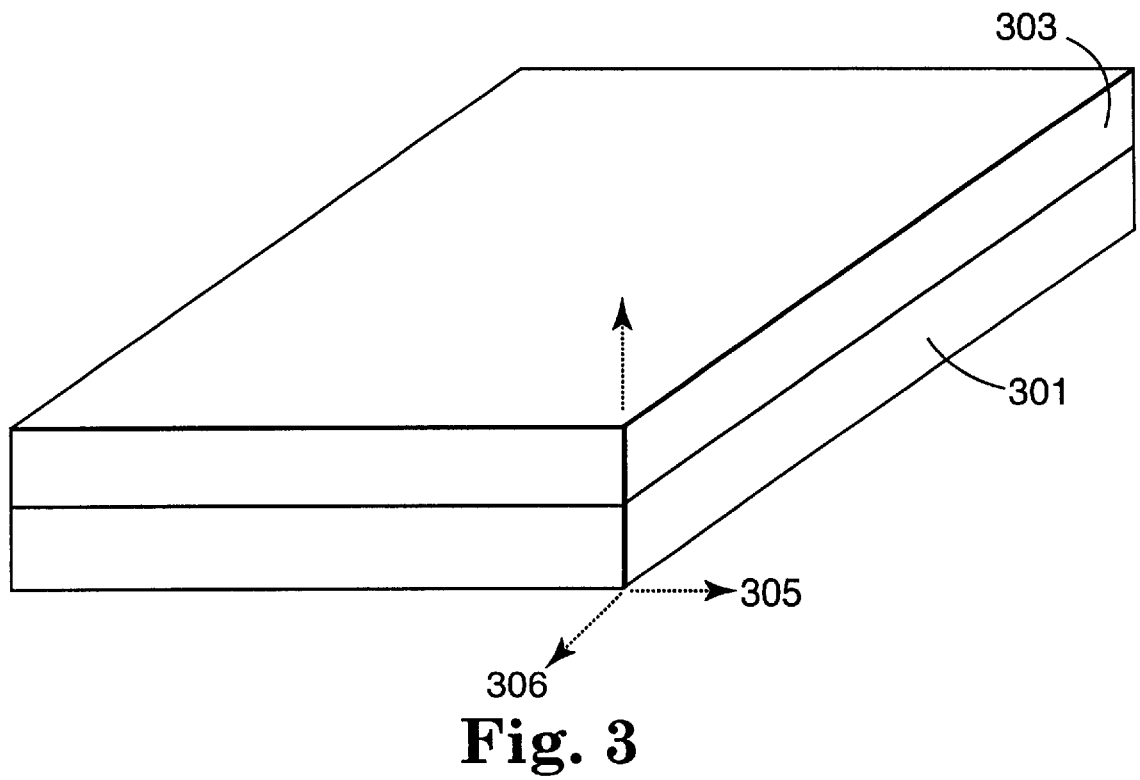
FIG. 3 illustrates still another optical film in accordance with another embodiment of the invention.

Control of the reflection and transmission axis orientations of an optical polarizer provides a number of advantages. As illustrated in FIG. 3, it is often desirable to combine a reflective polarizer 301 of the type described herein with an absorbing polarizer 303. Such a combination provides good overall polarization efficiency. One advantage associated with combining reflective polarizers of the present invention with conventional absorbing polarizers is that the reflection axis of the reflective polarizer with respect to the film roll direction can be purposefully made to match the extinction axis of the absorbing polarizer. In one embodiment of the present invention, a reflective polarizer having a reflection axis 305 relative to the film roll up direction which matches that of a typical absorbing polarizer can be made. Matching the respective reflection and extinction axes 305 with respect to the film roll up direction (and respective transmission axes 306) of the reflective polarizer and the absorbing polarizer, facilitates post processing and lamination. For example, the two films may be laminated using roll-to-roll lamination of a reflective polarizer with a downweb (MD) rather than a crossweb (TD) reflection axis to a typical dichroic polarizer with a downweb (MD) extinction axis (e.g., as would result from a typical polyvinyl alcohol (PVA) length oriented film stained with iodine and fixed with boric acid to make a dichroic polarizer).

The ability to control the pass and reflection (block) direction of a reflective polarizer also permits simultaneous orientation of the reflective polarizer and an absorbing polarizer. In one embodiment, an orientable absorbing polarizer (e.g., using a PVA coating and absorbing dye) may be applied to the film between the first and second orientation processes. The absorbing polarizer is oriented by the second orientation process. When such a process is used, in certain instances the block axis of the absorbing polarizer may be aligned with the transmission axis of the reflective polarizer. In the present invention, by controlling the reflection (block) and transmission axes, the absorbing polarizer and the reflective polarizer can be effectively aligned.

A first, LO draw process may be used, for example, to orient the film with respect to a first axis. The film may then be coated with an appropriate coating and then oriented in a tenter. The orientation in the tenter serves to orient both the absorbing polarizer and the reflective polarizer with respect to the axis of the second draw process. Coating processes and materials particularly suitable for use in such processes are described in United States patent applications filed concurrently herewith, Ser. No. 09/006,468, entitled "Optical Device with a Dichroic Polarizer and a Multilayer Optical Film", and Ser. No. 09/006,455, entitled "Dichroic Polarizing Film and Optical Polarizer Containing the Film", the contents of which are incorporated herein by reference.

In yet another embodiment, one or more layers of the film may contain one or more dyes, dichroic dyes, pigments, or other such additives which would preferentially absorb one polarization of light. Such a film obtains combined performance of an absorbing polarizer and reflective polarizer. In a multilayer film the additive may be formed in a separate layer or may be mixed into one of the first or second materials in at least some of the layers. When mixing the additive into an optical layer, in certain instances it may be desirable to mix the additive into the material which is not optically oriented (non-oriented) during one of the draw processes (e.g., the first draw).

It may also desirable to combine an additive with a blend film. A blend film may be combined with a separate layer which incorporates an absorbing additive to obtain an absorbtive and reflective polarizing film. The additive may also or alternatively be mixed into one of the two phases of the blend film. For example, an additive may incorporated into a disperse phase of a blend film. The blend film may also be constructed with two or more separate layers of the blend construction. An absorbing additive may be mixed into one phase of at least one of the layers while leaving at least one other layer free of the additive. The final film will exhibit both absorbtive and reflective polarizing properties.

As noted above, the present invention is applicable to blend optical films. In a typical blend film, a blend of at least two different materials are used. A mismatch in refractive indices of the two or more materials along a particular axis can be used to cause incident light which is polarized along that axis to be substantially scattered, resulting in a significant amount of reflection. Incident light which is polarized in the direction of an axis in which the refractive indices of the two or more materials are matched will be transmitted with a much lesser degree of scattering. By controlling the relative refractive indices of the materials, a variety of optical devices can be constructed, including reflective polarizers, mirrors, and the like. Blend films may assume a number of different forms. For example, the blend may be formed of a disperse phase within a continuous phase or may be formed of co-continuous phases. While specific examples are provided below, the present invention is applicable to the various types of blend films. The general formation and optical properties of various blend films are further discussed in the commonly assigned patent applications Ser. No. 08/610,092, filed Feb. 29, 1996, and entitled "Diffusely Reflecting Polarizing Element Including a First Birefringent Phase and a Second Phase", and Ser. No. 08/801,329, filed Feb. 18, 1997, and entitled "Optical Film with Co-Continuous Phases", the contents of which are incorporated herein by reference.

Figure 4:
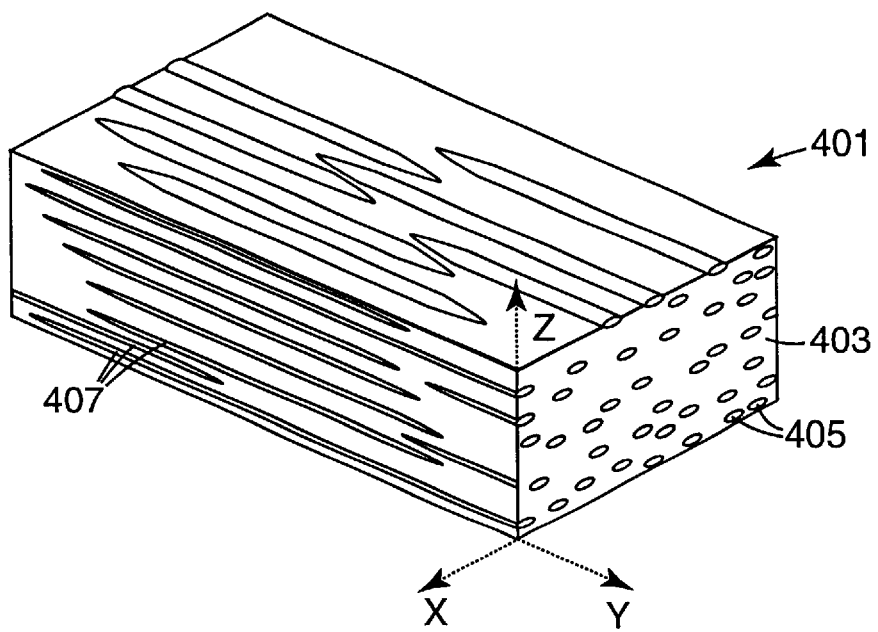
FIG. 4 illustrates a blended polymeric optical film in accordance with another embodiment of the invention.

FIG. 4 illustrates an embodiment of the invention in which two materials are formed in a blend. In FIG. 4, an optical film 401 is formed of a continuous (matrix) phase of first material 403 and a disperse (discontinuous) phase of a second material 405. The optical properties of the film may be used to form a blend polarizing film. In such a film, the refractive indices of the continuous and disperse phase materials are substantially matched along one in-plane axis and are substantially mismatched along the other in-plane axis.

A process for forming an improved optical film of the type illustrated in FIG. 4 in accordance with one embodiment of the invention will now be described. Generally, one or both of the materials are birefringent. The selection of the particular materials will depend on the desired optical properties of the optical film. In the example embodiment illustrated in FIG. 4, an optical polarizer is constructed. For an optical blend polarizer, it is desirable to match the refractive indices of the materials in the direction of one in-plane axis of the film as close as possible while having as large of a refractive indices mismatch as possible in the direction of the other in-plane axis.

In order to accomplish the desired result, the film is drawn in a first direction under conditions which do not induce optical-orientation in at least one of the materials in the direction of the draw. The material is then drawn in a second direction under conditions which induce optical orientation in at least one of the materials. In one example, the non-optical orientation and optical orientation are induced in the same material (e.g., both orientations are induced in the continuous phase). In another example, the optical orientation of the second draw is induced in at least the material unaffected by the first draw (e.g., the first draw does not affect the disperse phase while the second draw imparts orientation to the disperse phase). As described more fully below, such a process may be used to obtain improved mechanical properties of the optical film as well as improved optical properties.

In accordance with one particular embodiment the film 401 is first drawn in the direction of one in-plane axis. Based on the above described visco-elasticity properties of the materials used in the blend film 401, the draw conditions for the first draw may be selected such that the draw is non-optically orienting for the disperse phase material 405 (e.g., the orientation, if any, induced in the first material by the first draw is small enough so as to not introduce significant birefringence in the first material). For example, in certain instances it may be desirable to have the birefringence in the first material induced by the first draw be less than about half of the birefringence induced in the first material by the second draw. In other instances it may be necessary or desirable to have the birefringence in the first material less than about one fourth the birefringence induced by the second draw. In certain applications, essentially no birefringence is induced in the first material in the direction of the first draw (e.g., non-optically oriented or non-oriented).

The draw conditions of the first draw are also selected to be non-optically orienting or slightly optically orienting for the continuous phase material 403. As described more fully below, the induced orientation of the continuous phase material in the first direction, in conjunction with further molecular orientation induced by a second draw orthogonal to the first draw, creates a film having biaxial characteristics in the continuous phase material 403. The biaxially nature of the film 401 improves the films mechanical properties (e.g., increases resistance to tear initiation and fracturing).

It is desirable that the molecular orientation in the continuous phase material 403 induced by the first draw be large enough to provide improved mechanical properties without significantly effecting the overall optical performance of the film. By using materials which have different visco-elasticity characteristics (e.g., longest average relaxation time), the first draw step may be performed in a manner which improves the mechanical properties of the film (e.g., by creating biaxial tear resistance) without significantly impacting the optical performance of the film. For example, if the disperse phase material is birefringent, the first draw can be controlled to improve the mechanical properties of the film by slightly orienting the continuous phase material in the direction of the first draw without introducing significant birefringence in the disperse phase material 405 in the direction of the first draw.

In addition to improved mechanical properties, using the above described draw conditions for the first draw also improves the optical characteristics of the film. In a blend film such as the one illustrated in FIG. 4, the disperse phase material 405 has a shape (e.g., rod-like structures 407). It should be appreciated, however, that a number of different structures for the disperse phase material 405 are suitable. Regardless of shape, it is generally desirable that the disperse phase material 405 be relatively thin in the thickness direction (z-axis). Within limits, as the thickness of the disperse phase material 405 is reduced in the thickness direction, the optical performance of the film improves. For example, if the first draw is performed in the length direction of the rod-like structure 407 depicted in FIG. 4, the thickness of the rod-like structures 407 is reduced. This could be accomplished by drawing the blend material in the machine direction using a length orienter (LO). The temperature, draw ratio and rate would be selected to obtain the desired molecular orientation in the continuous phase material without optically orienting the molecules in the disperse phase material. The shape of the disperse phase material is, however, altered. Since the draw conditions are such that substantial molecular orientation is not introduced in the disperse phase material, the improved overall optical performance of the film resulting from reduced thickness of the disperse phase along the z-axis is obtained while at the same time improving the mechanical properties of the film. While in certain instances the first draw process may be slightly optically orienting for the continuous phase material, the degradation in the optical performance of the film introduced by this orientation may be partially or fully compensated for by the improved optical performance provided by the shaping of the disperse phase material.

Following the first draw, a second draw is performed along the second orthogonal in-plane axis. The draw conditions for the second draw are selected to produce optical orientation in the direction of the second draw in at least the continuous phase material 403. In certain instances it is also desirable to induce optical orientation in the disperse phase material 405 as well (e.g., where oppositely birefringent materials are used). As noted above, this second draw introduces biaxial characteristics in the continuous phase material 403. The optical orientation of the disperse phase material 405 causes the disperse phase material 405 to be birefringent along the axis of the second draw.

The molecular orientation of the continuous phase material 403 introduced by the first draw may be small enough to impart only a weak birefringence in the continuous phase material in the first direction but large enough to obtain the desired mechanical properties. The second draw conditions may also be selected to introduce a significant birefringence in the continuous phase material 403 in the direction of the second draw. As described above, this process may be used to produce an optical polarizer having improved optical and mechanical properties.

In addition to the above example, a number of other beneficial effects may be obtained from biaxially drawing a blend film while enhancing the optical effects of the two materials. In one embodiment, one may use a first positively birefringent material as a continuous phase whose average relaxation time is small relative to the time of the first draw and a second positively birefringent material as the disperse phase whose average relaxation time is about equal to or slightly longer than the time of the first draw. When such a film is drawn in a first direction under appropriate draw conditions, substantial optical orientation results in the dispersed phase, but only minimal or no orientation results in the continuous phase due to relaxation. The film may be drawn in a second direction under conditions (e.g., cooler temperatures) at which the average relaxation time for the disperse phase is significantly longer than the time of the second draw so as to be unaffected by the draw because of the now increased hardness of the dispersed phase relative to the continuous phase. Hence, orientation is retained in the disperse phase in the first draw direction only. The conditions of the second draw process may also be selected such that orientation is induced in the continuous phase, resulting in a net orientation of the continuous phase in the direction of the second draw. By choosing the materials and process conditions to match the refractive indices of the disperse and continuous phases in the direction of the second draw, while producing a mismatch in the direction of the first draw, a polarizer having some biaxial properties in the continuous phase may be obtained. Such a process could also be used for a pair of negatively birefringent materials having sufficiently different visco-elastic properties as described above.

In another example, similar to the above example, an additional process may be used to cure the disperse phase. In such an embodiment, the dispersed phase is cured after the first draw (e.g., by temperature, radiation, etc.), in order to maintain the oriented properties of the disperse phase. In such an embodiment, the processing conditions (e.g., temperature) of the second draw may now be more liberally chosen in order to induce desired orientation in the continuous phase without orienting the disperse phase since the disperse phase is now cured and will substantially retain its orientation.

In still another embodiment, a film can be drawn in the first direction under processing conditions at which the disperse phase is unaffected by the draw, and therefore retains isotropic orientation. Orientation may be induced in the continuous phase in the first direction. The film may be drawn in a second direction under processing conditions at which substantial orientation results in the disperse phase, but at which only minimal orientation is induced in the continuous phase. In this manner, the continuous phase retains its primary orientation in the direction of the first draw.

In still another example embodiment, positively birefringent material is used for the continuous phase (e.g., PEN, coPEN, etc.) and negatively birefringent material is used for the disperse phase (e.g., syndiotactic polystyrene (sPS)). The film is drawn in a first direction under process conditions at which little or no orientation results in the disperse phase, and minimal orientation results the continuous phase. The film is then drawn in a second direction under processing conditions at which the disperse phase is oriented. The processing conditions may also be selected so that orientation is induced in the continuous phase, resulting in a net orientation of both phases in the direction of the second draw. Due to the opposite signs of birefringence of the two materials, it is possible to have the disperse and continuous phases match in refractive index in the direction of the first draw and mismatch in the direction of the second draw. In this manner, a blend polarizer can be made which has some biaxial properties (e.g., improved physical properties of the continuous phase) and good optical performance.

In various embodiments of the invention, one draw process is used where the film is drawn under conditions which do not induce substantial, if any, optical orientation in at least one of the materials. The invention is not limited to the particular embodiments. For example, in certain instances it may be desired that at least one particular material have little or no optical orientation in the direction of at least one draw. In one embodiment, some optical orientation may initially be induced by the draw in that material. In this case, the non-orienting draw process may further include a subsequent heating step which relaxes the optical orientation. In this case, the two materials in the film must have sufficiently different enough characteristics (e.g., glass transition temperatures, levels of crystallinity, etc.) that the optical orientation can be selectively relaxed by heating the film to a temperature which does not significantly compromise desired molecular orientation in the other material. The temperature used for the heating step as well as the materials used in the film are selected in consideration of the visco-elastic properties of the materials and the ability to decouple the material responses. In another embodiment, the subsequent heating step may alter the crystallinity of at least one material (e.g., one phase of a blend) to increase the birefringence of that material, further enhancing the optical performance.

As will be appreciated, a subsequent heating step may be part of a non-orienting (or non-optically orienting) draw process for one of the materials. In this manner, the first draw process produces a film having a first material without optical orientation along the axis of the first draw. The first draw process, including the subsequent heating step may also be an optically orienting draw process for the second material (e.g., the process may produce optical orientation in the second material along the axis of the first draw ). In a second draw process, the film is drawn in a second direction. The second draw process may be optically orienting for one or both of the first and second materials. In this manner, two different draw processes are used, one of which may be non-orienting for a particular material, the other of which is optically orienting for the particular material. Such a process may be used to obtain a film having desired optical and/or mechanical properties.

As described above, in some embodiments a small level of molecular orientation is desirable in the first material during the non-optically orienting draw step. This small level should not appreciably alter the refractive indices, i.e. less than a normalized difference of 0.04 and more preferably less than 0.02. In certain embodiments, this small level of orientation enhances the nucleation of crystals that alter the visco-elastic response of the first material during the second draw step. Preheating during the second step may then grow the crystals and suppress relaxation enabling the second draw step to optically orient the first material, sometimes under conditions that would be non-optically orienting without the initial molecular orientation. Uniformity of such nucleating orientation through the thickness of the film after the first draw step tends to impact uniformity of first material response in the second draw. Uniformity may be controlled by the uniform heating and quenching of the film or by balancing the visco-elastic response through the film during the first draw, heating, stretching and quenching process.

While an order is implied for the various draw processes described in the above examples, the order is used to facilitate an explanation of the principles and is not intended to be limiting. In certain instances the order of the processes can be changed or performed concurrently as long as subsequently performed processes do not adversely affect previously performed processes. For example, the two materials may be drawn in both directions at the same time. Referring again to FIG. 1, the optical film 101 may be simultaneously drawn in the direction of both in-plane axes. As in various of the above embodiments, the film 101 may be a multilayer film, a blend film or a combination thereof. The film includes at least two materials having different visco-elasticity characteristics. When the film is concurrently drawn along both in-plane axes the draw temperature will be the same for the materials in the film. The draw ratio and rate, however, may be separately controlled. For example, the film may be drawn relatively quickly in the direction of the x-axis and relatively slowly in the direction of the y axis.

The materials, draw ratio and rate of the concurrent biaxial draw may be suitably selected such that a draw along a first draw axis (e.g., the quick draw) is optically orienting for one or both materials along the first draw axis while the draw in the other direction (e.g., the slow draw) is non-orienting (or non-optically orienting for one of the two materials along the second draw axis. Thus, it will be appreciated that the response of the two materials to the draw in each direction may be independently controlled. Using such a process, the optical characteristics (e.g., z-axis refractive indices matching of adjacent layers in a multilayer optical film) and/or the mechanical properties (e.g., resistance to tear or creasing, stiffness, or dimensional stability including but not limited to warpage, thermal and hygroscopic expansion and shrinkage) may be improved.

Many different materials may be used to fabricate the optical films in accordance with the present invention. The materials must generally be suitable for processing into the desired structure. For example, if a multilayer film is to be produced, two or more materials which can be formed into multiple layers must be chosen. If the multilayer structure is coextruded, then the materials selected must be coextrudable. The materials should be formable into a good cast web that can be drawn. Interlayer adhesion and post processability should also be considered in construction of a multilayer film. The material should also be free from any undesirable orientation prior to the draw processes. Alternatively, deliberate orientation can be induced during the casting step as a process aid to the first draw step. For example the casting step may be considered part of the first draw step. In another example, the casting step can be a nucleating step for crystallization that alters the relaxation characteristics of the second material for subsequent draw steps. General process conditions for casting multilayer webs are described in United States patent application filed concurrently herewith having Ser. No. 09/006,288 and entitled "Process for Making Polymeric Multilayer Optical Films", incorporated herein by reference.

The materials used in the optical film must also exhibit the desirable optical properties (e.g., birefringence) and must have different enough visco-elastic characteristics to permit proper selection of processing conditions for the desired result. In selecting materials consideration may be given to glass transition temperatures, crystallization and crosslinking behaviors, molecular weight averages and distributions, chemical compositions and structures and other optical properties (e.g., refractive indices, dispersion, etc.).

In addition to the particular examples set out herein, suitable materials for multilayer films of the present invention include, for example, the materials listed in the above referenced concurrently filed patent application having Ser. No. 09/006,288. Additional suitable materials for polymeric blend films include, for example, the materials described in the above referenced patent application Ser. No. 08/610,092 and concurrently filed application having Ser. No. 09/006,601 and entitled "Modified Copolyesters and Improved Multilayer Reflective Films, incorporated herein by reference.

The following examples include exemplary materials and processing conditions in accordance with different embodiments of the invention. The examples are not intended to limit the invention but rather are provided to facilitate an understanding of the invention as well as to provide examples of materials particularly suited for use in accordance with the various above-described embodiments.

EXAMPLE 1

Example 1 is a multilayer optical film constructed of alternating layers of polyethylene naphthalene (PEN) having an intrinsic viscosity (IV) of 0.48 and polyethylene terephthalate (PET) having an IV of 0.6 (IVs measured in a solvent, for example, of 60% phenol and 40% ortho-dichlorol benzene) at 30° C. Typical refractive indices of PEN after a uniaxial draw (using a tenter or similar process) are around 1.85, 1.64, and 1.49 at 632.8 nm along axes of the drawn, non-drawn and thickness directions, respectively. For biaxially drawn, heat set state, the refractive indices of PET are around 1.65, 1.65, and 1.49 at 632.8 nm in the first draw, second draw and thickness directions, respectively. Thus, these materials are particularly well suited for the invention since alternating layers of these two materials should have matched z index and a nearly matched first draw direction index. PEN and PET also exhibit good inter-layer adhesion in a drawn multilayer construction. This example also illustrates the orientational state of a uP-bP-1 polarizer in which the transmission (pass) state is coincident with the direction of the first draw.

A process for fabricating a multilayer PEN:PET polarizing film will now be described. A multilayer web of PEN and PET layers may be coextruded at an appropriate temperature and die cast on a chill roll to form pairs of alternating PEN and PET layers. The thickness and number of layers will depend on the desired optical properties of the resultant optical film. For example, hundreds of layers may be cast and graded in thickness to cover the desired wavelength spectrum. The general process and considerations for coextruding the multi-layer construction are described in the above referenced patent application Ser. No. 08/402,041.

To provide flow stability, a protective skin layer of PEN may be used between the multilayer optical stack and the die wall surfaces. PEN skin layers are also used to prevent break-up of pre-crystallized PET layers. In certain instances, the stack may be split and stacked in a multiplier to (double the number of layers. A protective boundary layer of PEN may be provided between the multilayer optical stack and the multiplier wall surface. A web cast in this manner is comprised of a central thick layer of. PEN, two outer skin layers of PEN and two multilayer optical stacks of PEN:PET between the skins and the protective boundary layer.

A web of PEN and PET was cast as described above with two multiplication steps to form a film having approximately 800 layers in four multilayer optical stacks separated by protective layers. Minor flow instability was noted in the case web. Prior to the first draw, the web was heated to crystallize the PET prior to drawing. The cast web was heated to 145° C. for 50 seconds and quenched to room temperature. The web was then heated to 100° C. for 60 seconds, to 120° C. for 10 seconds, to 140° C. for 20 seconds, and to 150° C. for 20 seconds. The web was then drawn 4×1 at 150° C. for 20 more seconds (at a nominal strain rate of 15% per second) and quenched to room temperature. Under these conditions, the PEN layers did not undergo significant molecular orientation while the crystallized PET layers were oriented in the direction of the first draw. After the first draw, the refractive indices of the PEN skin layers, which could be directly measured, were 1.643, 1.641 and 1.639 at light of 632.8 nm in the first draw, second draw and thickness directions, respectively.

The film was next heated to 100° C. for 60 seconds, to 120° C. for 40 seconds and then drawn 1×4 in the second direction over 40 seconds at 120° C. (i.e., to a final total draw ratio of 4×4). Daring the second draw both materials were substantially oriented in the direction of the second draw. The refractive indices of the PEN skin layers were then measured to be 1.616, 1.828, and 1.532 at light of 632.8 nm in the first draw, second draw and thickness directions respectively. The PET refractive indices in the thickness direction were estimated to be 1.49.

Figure 5A:
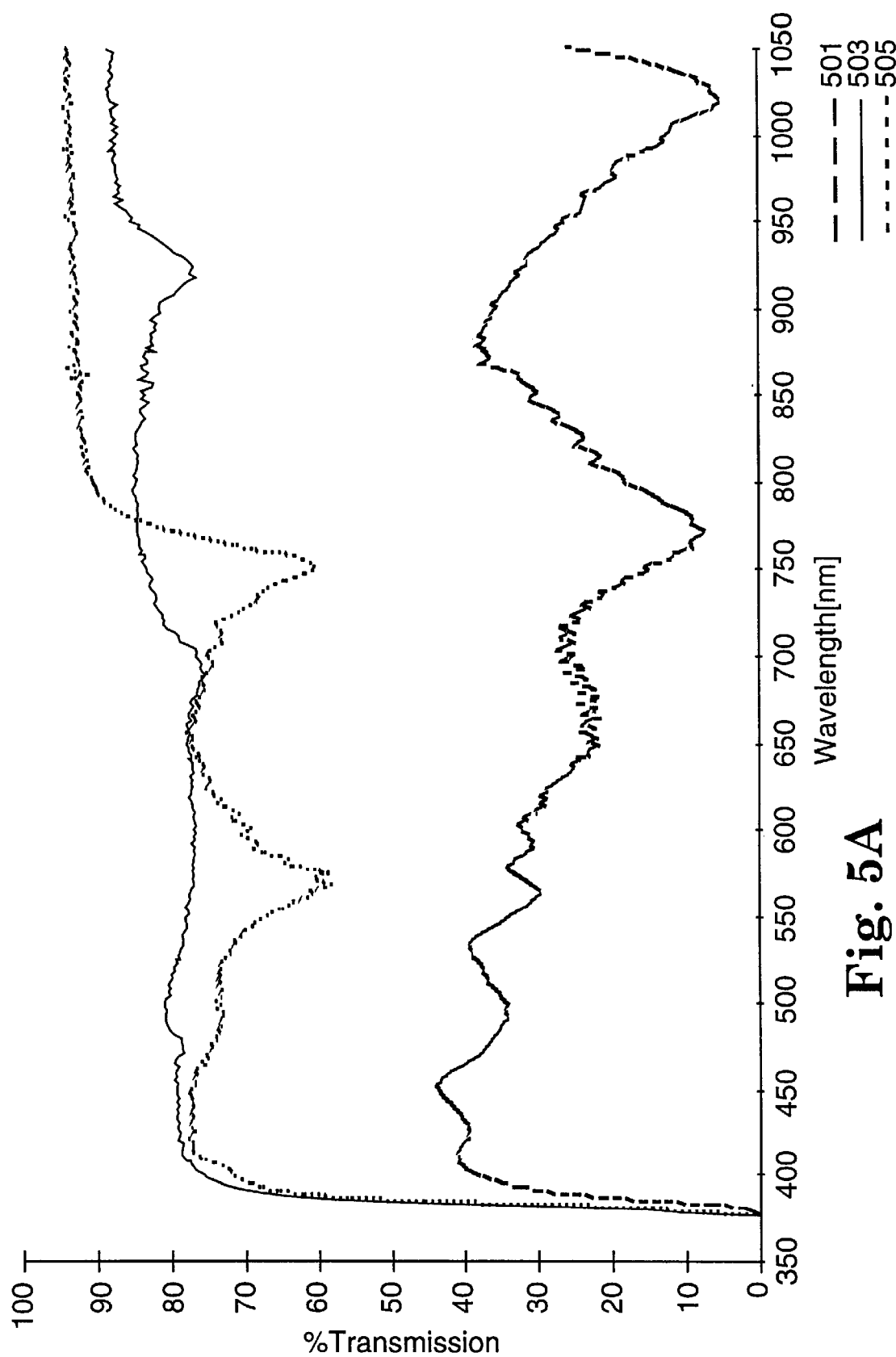
FIGS. 5A through 5C illustrate transmission characteristics of a film fabricated in accordance with one embodiment of the present invention.

The refractive indices of the individual optical stack layers of the multilayer film cannot be directly measured. However, indices of the optical stack can be measured. They are a weighted average of the individual layer indices. If interdiffusional effects are small, the indices of the individual layers can be estimated. In this case, the indices of the thicker skin and internal protective boundary layers (PBLs) are anticipated to be the same as the optical layer indices for the same material. Given indices for one optical material from these and the stack indices as measured by destructive peeling of the outer thick layers, the other index can be estimated by assuming a linear average. The relationship OF the various layers also can be estimated by examining the optical properties of the optical film. For example, transmission in the block and pass directions provide an indication of relative in-plane refractive indices. Coloration and performance at off-angle indices provide an indication of the relative magnitude of the refractive indices in the thickness direction. Collimated transmission intensities of the above described film was measured using a Perkin-Elmer (Norwalk, Conn.) Lambda 19 Spectrophotometer equipped with a Glan-Thompson polarizing prism at the source and an integrating sphere at the detector. FIG. 5A depicts the percentage of transmission versus wavelength of light incident on such a film in the reflection (block) and transmission (pass) directions by lines 501 and 503 respectively. FIG. 5A also depicts transmission of light at 60° off-angle by line 505. Because the off-angle measurement was desired, the sample was mounted on a rotating stage set 5 cm from the 2 cm circular aperture to the integrating sphere. Generally the collimated intensity in the polarizer reflection direction was measured to about 32.1% in the visible spectrum. The overall intensity in the transmission direction was measured to be about 78.2%. The reflection direction was coincident with the second draw direction. The transmission direction was perpendicular to this, being coincident with the first draw direction. After measuring the transmission of the pass state, the average transmission intensity at 60 degrees (rotating 60 degree away from the pass state, around the block axis in order to sample p-polarization) was measured to be about 72.9%. A measure of the off-angle color deviation can be calculated from the provided spectrum over the visible spectral band of interest, e.g., 420 nm to 720 nm, as the root mean square deviation from the average transmission at the rotated angle. This "off-angle color" was found to be 4.64%. Likewise the normal angle color was found to be 1.37%.

Figure 5B:
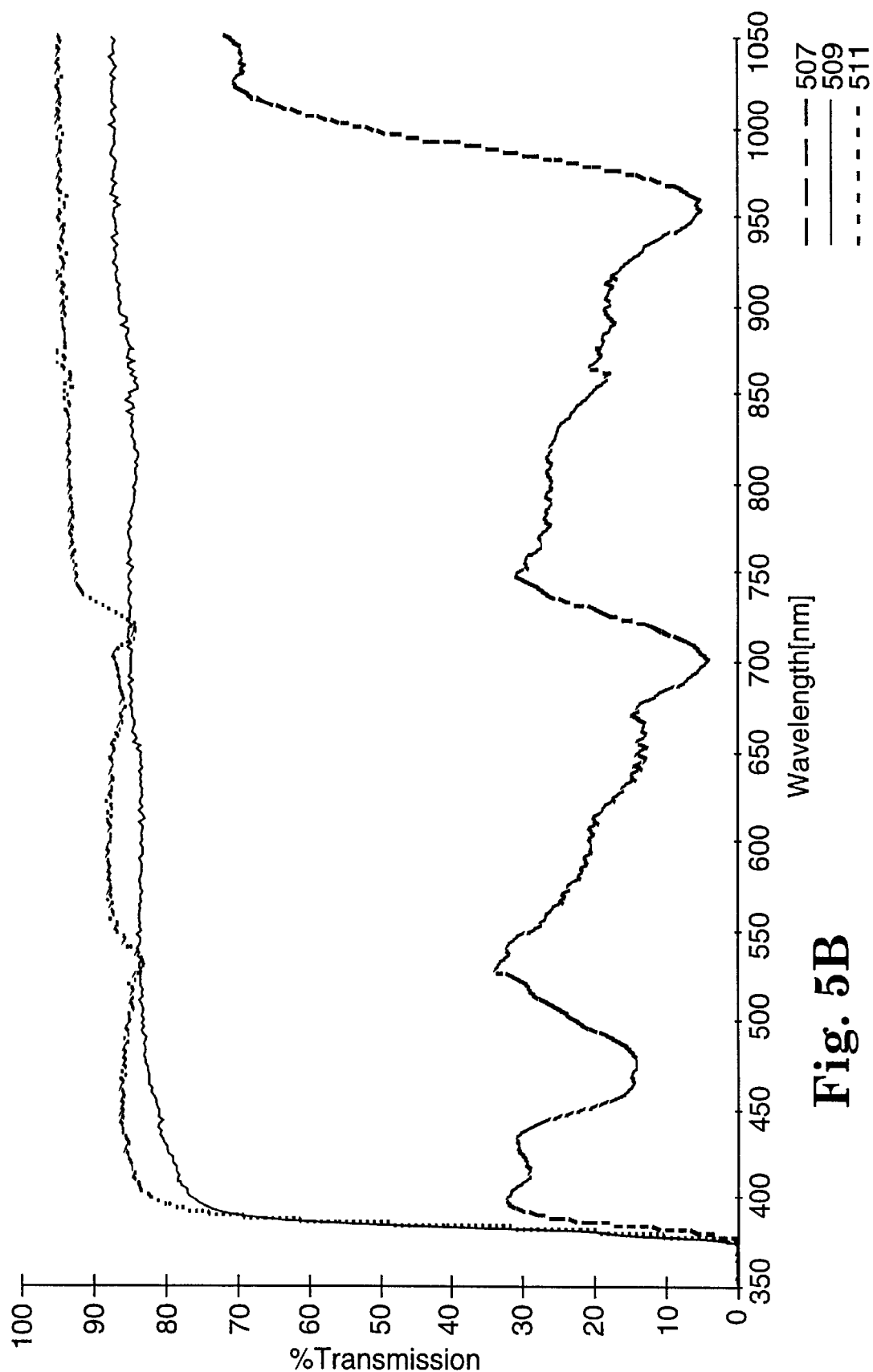

The nature of a film formed in the manner described above permits the film to be heat set subsequent to drawing. The drawn film described above, was subsequently heat set under tension at 175° C. for 85 seconds. The indices of the PEN skin layers were then measured as 1.643, 1.837 and 1.500 at light of 632.8 nm in the first draw, second draw and thickness directions, respectively. FIG. 5B illustrates a plot of transmission versus wavelength for the heat set film for reflection 507, transmission 509 and 60° off-normal 511 incident light. The overall reflection polarization transmission reduced to 19.6%. The normal and 60 degree average transmissions were 83.3% and 86.3%. The normal and off-normal colors, again defined as the mean-square deviation from the average transmission for transmission polarized light integrated over the spectral band of interest, were measured as 1.31% and 1.25%, respectively.

Figure 5C:
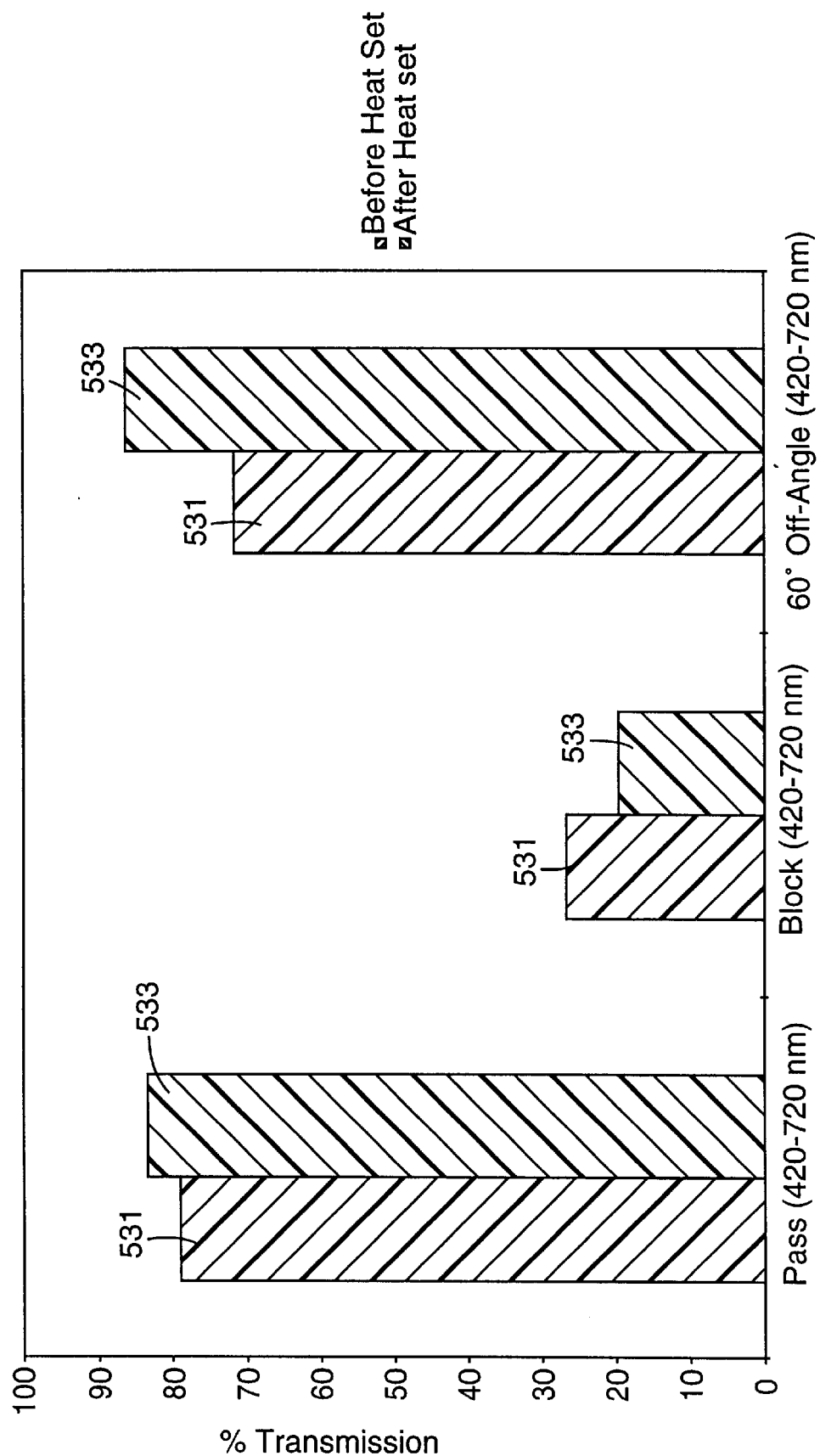

The chart in FIG. 5C compares the transmission, reflection (illustrated as transmission intensities for light polarized in the reflection state) and off-normal characteristics of the above film before 531 and after 533 the heat set for light ranging from 420–720 nm. Because of a small difference in thickness between the physical samples whose spectra are portrayed in FIGS. 5A and 5B, a direct comparison is best achieved by comparing data over the same spectral band relative to the thickness distribution profile of the multilayer stack. The point of reference used is the transmission minimum of FIG. 5B found at 4.11% at 700 nm. The equivalent minimum in FIG. 5A is at 8.84% at 762 nm. Thus, the data in FIG. 5C for the condition before heat setting is derived from the band 482 nm to 782 nm in FIG. 5A. As will be appreciated from FIG. 5C, the heat set improved the performance of the film in each instance. Moreover, the heat set film exhibits off-normal transmissions (for light polarized in the transmission state) which exceed the normal angle transmissions. Prior to heat setting, the PEN and PET z-axis indices are estimated as 1.532 and 1.49 at 632.8 nm, respectively for a sample similarly processed to that above. After heat setting, values are estimated for PEN and PET as 1.50 and 1.49. Thus heat setting substantially reduces the z index difference. The transmission of light polarized in the transmission state are also greatly enhanced by better index matching in-plane after heat setting.

As illustrated above, a polarizer film comprised of PEN:PET multilayers can be manufactured which approximately matches the refractive indices in the thickness direction resulting in low color films having low angular dependence on residual color. In addition, the film exhibited improved mechanical stability including an enhanced resistance to tear initiation when compared with uniaxially drawn films of similar material.

The process parameters used to form an optical film can be varied to obtain different desired properties. For example, higher IV PET materials (e.g., around 0.7 to 0.9) tend to increase viscosity and improve viscosity match during coextrusion. This would serve to reduce multilayer flow defects.

Residual scattering in the film is reduced by using higher final draw ratios or using shorter/colder pre-crystallization conditions. Residual scattering may also be reduced by reducing the initial crystal size. Nucleating agents may be added to the PET, for example, to increase the rate of quiescent crystallization, to control crystal size and to reduce residence time. Copolymers could also be used. The amount of deviation from the homopolymer may reduce crystallinity, but also may diminish the rate of crystallization which tends to increase processing time and temperature for pre-crystallization. The ultimate crystallinity of PET can be reduced by the substitution of Di-ethlylene glycol (DEG) for a portion of the ethylene glycol. This would tend to improve extinction and allow for an increased draw ratio in the first direction.

In the particular processing example provided above, the 0.48 IV PEN is drawn slowly at 150° C. at 15% per second. In manufacturing such a film, it may be desirable to use a length orientor (LO) provided in a conventional film processing line for the first draw. The LO typically draws film at a nominal strain rate of 300% per second or more. A draw temperature of about 165° would be suitable for such a process. At higher draw rates of about 1000% per second, a temperature of about 170° or more may be required. Rather than increasing the temperature, lower IV PEN (e.g., PEN of lower molecular weight) could be used to reduce the relaxation times at a given temperature.

EXAMPLE 2

Example 2 illustrates the utility of the process invention for making a polarizer with the reflection state coincident with the axis of the first draw and with the transmission state coincident with the axis of the second draw using the same materials, PEN and PET as used in Example 1. Using the same materials to obtain a substantially different polarizer further illustrates the flexibility provided by the present invention for selection of materials. This example also illustrates the orientation state of a bP-uP-2 polarizer.

In Example 2, 0.48 IV PEN and 0.77 IV PET were dried and co-extruded into a 224 multilayer feedblock equipped with an internal PBL. The multilayer stack was split with an asymmetric multiplier to form two streams in width ratio of 1.55:1, spread to equivalent widths and restacked to form a two packet multilayer stack of 448 layers separated by an internal protective layer. PET (IV 0.77) was used in the PBLs. A PEN (IV 0.48) skin was added and the total stream was cast from a die onto a quench wheel set at 60 C. The PEN skin and PET PBL indices were essentially isotropic after casting with indices of 1.64 and 1.57 at 632.8 nm, respectively. The skins comprised about 35% of the construction, the PBLs about 15% and the multilayer optical stack packets about 50%. The cast thickness was approximately 0.1 cm.

The first draw process used a conventional length orientor (LO). The film was preheated with hot rollers set at 120 C and fed into a draw gap comprising a slow roll and fast roll and an infra-red heater set at 60% power. The infrared heater consisted of an assembly of IR heater elements (approximately 5000 watts per element), each about 65 cm long. The elements were approximately 10 cm above the film. Residence time in the draw gap was about 4 seconds. The fast roll was set to accomplish a 5 times draw and the drawn film was quenched. The drawn width diminished to about 85% of its original width. The average in-plane indices of the PET remained below 1.58 at 632.8 after the first draw step was completed, while the average PEN indices were highly oriented at about 1.85, 1.59 and 1.53 in the in-plane draw direction y-axis (MD), the in-plane cross-web direction x-axis (TD) and thickness (z) (ND) direction, respectively. The film was next drawn approximately 3.3 times transversely using a conventional tenter in a second draw step. The tenter was set at 145 C in the preheat, 138 C in the draw zone, 227 C in the heat set zone and 49 C in the quench zone. Preheating, drawing and heat setting were accomplished over periods of approximately 25, 5 and 40 seconds. The final PEN indices were 1.82, 1.68 and 1.49 while the PET indices were approximately 1.56, 1.67 and 1.56 at 632.8 nm. Additional measurements were taken at other wavelength as provided below:

| Example 2 Wavelength | MD PEN | MD PET | TD PEN | TD PET | ND PEN | ND PET |
|---|---|---|---|---|---|---|
| 632.8 | 1.8243 | 1.563 | 1.6833 | 1.6668 | 1.4891 | 1.5558 |
| 568 | 1.8405 | 1.5654 | 1.6924 | 1.6708 | 1.4912 | |
| 488 | 1.8766 | 1.5766 | 1.7153 | 1.6894 | 1.5018 | |
| 436 | 1.92 | 1.5888 | 1.7436 | 1.711 | 1.5221 | |

These indices resulted in the normalized index differences below:

| Example 2 Wavelength | Normalized Differences | | |
|---|---|---|---|
| | MD | TD | ND |
| 632.8 | 0.1543 | 0.0099 | 0.0438 |
| 568 | 0.1615 | 0.0128 | |
| 488 | 0.1738 | 0.0152 | |
| 436 | 0.1888 | 0.0189 | |

The final film, processed in this manner, exhibited a reflection axis coincident with the first draw direction with an average transmission of light polarized for reflection over the range 400–700 nm of 7.4%, and exhibited a transmission axis coincident with the second draw direction with an average transmission of light polarized for transmission over the range 400–700 nm of 85.7%. When aligned in the pass state, color was visibly minimal when viewed off-angle in the plane defined by the transmission polarization state and thickness directions.

EXAMPLE 3

Example 3 is a variation of Example 2 using a copolymer formed by the transesterification in the extruder of PEN and PET instead of standard PET as the first material. PEN (IV 0.48) and a 10%/90% PEN (IV 0.48)/PET (IV 0.77) blend were dried and co-extruded into a 224 multilayer feedblock equipped with an internal PBL (protective boundary layer). The multilayer stack was split with an asymmetric multiplier to form two streams in width ratio of 1.55:1, spread to equivalent widths and restacked to form a two packet multilayer stack of 448 layers, each stack of 224 layers being separated by an internal protective layer. The same 10%/90% PEN/PET blend was used in the PBLs. A PEN (IV 0.48) skin was added and the total stream was cast from a die onto a quench wheel set at 60 C. The skins comprised about 35% of the construction, the PBLs about 15% and the multilayer optical stack packets about 50%. The cast thickness was approximately 0.1 cm.

The first draw process used a conventional LO. The film was preheated with hot rollers set at 120C and fed into a draw gap comprising a slow roll and fast roll and an infra-red heater set at 60% power. Residence time was about 4 seconds. The fast roll was set to accomplish a 6 times draw and the drawn film was quenched. The drawn width diminished to about 85% of its original width. The average in-plane indices of the 10/90 PEN/PET copolymer remained below 1.61 at 632.8 after the first draw step was completed, while the average PEN indices were highly oriented at about 1.86, 1.60 and 1.52 in the in-plane draw (MD), the in-plane crossweb (TD) and thickness (z) directions (ND), respectively. The film was next drawn approximately 3.0 times transversely using a conventional tenter in a second draw step. The tenter was set at 145° C. in the preheat, 138° C. in the draw zone, 204° C. in the heat set zone and 49° C. in the quench zone. Preheating, drawing and heat setting were accomplished over periods of approximately 25, 5 and 40 seconds, respectively. The final PEN indices were 1.82, 1.69 and 1.48 while the copolymer indices were approximately 1.66, 1.67 and 1.52 at 632.8 nm. The indices were measured for several wavelengths and are provided below:

| Example 3 Wavelength | MD PEN | MD PET | TD PEN | TD PET | ND PEN | ND PET |
|---|---|---|---|---|---|---|
| 632.8 | 1.8207 | 1.6230 | 1.6854 | 1.6733 | 1.4845 | 1.5218 |
| 568 | 1.8383 | 1.6255 | 1.6972 | 1.6716 | 1.4924 | 1.5258 |
| 488 | 1.8758 | 1.6380 | 1.7198 | 1.6820 | 1.4987 | 1.5320 |
| 436 | 1.92 | 1.6559 | 1.7503 | 1.6991 | 1.5084 | 1.5486 |

These indices result in the normalized index differences provided below:

| Example 3 Wavelength | Normalized Differences | | |
|---|---|---|---|
| | MD | TD | ND |
| 632.8 | 0.1148 | 0.0072 | 0.0248 |
| 568 | 0.1229 | 0.0152 | 0.0222 |
| 488 | 0.1354 | 0.0222 | 0.0220 |
| 436 | 0.1477 | 0.0297 | 0.0263 |

The final film thereby exhibited a reflection axis coincident with the first draw direction with an average transmission of light polarized for reflection over the range 400–700 nm of 9.9%. The transmission axis was coincident with the second draw direction with an average transmission of light polarized for transmission over the range 400–700 nm of 85.0%. The measured sample was 67 microns thick. Good thickness uniformity was observed across the film width, with a high/low deviation of 8.1 microns.

The above film also also exhibited mechanical toughness. Tear initiation was difficult by hand. Tear propagation was also difficult and the film tore preferentially in MD. Another film was made using the above process but with a 20% higher TD draw ratio with compensating rate changes to maintain caliper and thus spectral coverage. The films thermal expansion coefficients were measured in MD and TD as $1.1 \times 10^{-5}$ and $2.2 \times 10^{-5}$ per degree Celsius between 25° C. 85° C. These expansion coefficients were considerably lower than the MD and TD values of $8.5 \times 10^{-5}$ and $3.0 \times 10^{-5}$ of a reflective polarizer constructed with PEN and a coPEN using a single draw process. The direction of maximum expansion remained along the transmission (pass) direction in these films. Shrinkage on the two-step drawn film was also reduced compared to a single draw process film, with measured MD and TD percent shrinkage of 0.118 and 0.254 for the two-step drawn film after heating the film to 85° C. for fifteen minutes.

In a variation of above and previous Examples, a copolymer formed by the transesterification in the extruder of PEN and PET may be used instead of standard PEN as the second material. In still another variation of the above examples, different materials may be used as skin and or PBL layers. For example, a copolymer of PEN and PET such as an 85/15 composition may be used. In-plane isotropic or totally isotropic layers may be useful, for example, for mechanical properties. Materials may be chosen to improve optical performance, for example, to reduce surface reflections by using a lower index material in the skin.

EXAMPLE 4

Example 4 is an exemplary process for forming another multilayer optical film in accordance with another embodiment of the invention. In this example the multilayer film is constructed of PEN (IV 0.48) and polybutylene terephthalate (PBT) (IV 1.4). A PEN:PBT film may be coextruded and die cast on a chill roller. Since PBT crystallizes quickly, separate crystallization may not be necessary depending upon the cast conditions. As in the above examples, some form of skin layer may be required to protect the crystallized PBT from breaking as the film is stretched. A three layer construction (PEN:PBT:PEN) film was made. The PEN and PBT were coextruded at 285° C. into a three layer feed block. The PEN material was fed into the two outer layers while PBT was fed into the core layer. The three layer film was die cast and quenched on a chill roll. The PBT crystallized as it was cast from the die. The film was heated to 100° C. for 60 seconds, to 120° C. for 10 seconds, to 140° C. for 20 seconds and to 150° C. for 20 seconds. The film was then drawn 4×1 (in the length direction) at 150° C. over period of 20 seconds followed by quenching to room temperature. A second draw step was performed by heating the film to 115° C. for 45 seconds and drawing the film 1×3 to a final total draw ration of 4×3.

In the above process, the second draw for the PEN material used a lower draw ratio than the first draw. The drawn film was subsequently heat set under tension at 175° C. for 85 seconds. The following table illustrates the resultant refractive indices of the two materials at various wavelengths of light for the first draw, second draw and film thickness directions.

| λ | Material | 1st Draw Axis | 2nd Draw Axis | Thickness Axis |
|---|---|---|---|---|
| 430 | PEN (n) | 1.692 | 1.94 | 1.517 |
| 430 | PBT (n) | 1.669 | 1.702 | 1.494 |
| | Δn | 0.023 | 0.238 | 0.023 |
| 480 | PEN (n) | 1.669 | 1.923 | 1.508 |
| 480 | PBT (n) | 1.651 | 1.685 | 1.486 |
| | Δn | 0.018 | 0.238 | 0.022 |
| 530 | PEN (n) | 1.654 | 1.887 | 1.501 |
| 530 | PBT (n) | 1.642 | 1.671 | 1.483 |
| | Δn | 0.012 | 0.216 | 0.018 |
| 630 | PEN (n) | 1.639 | 1.862 | 1.49 |
| 630 | PBT (n) | 1.631 | 1.658 | 1.473 |
| | Δn | 0.008 | 0.204 | 0.017 |

As the above table illustrates, the difference in reflective indices for the first draw and thickness directions have the same sign facilitating minimization of off-angle color. Moreover, the average difference in corresponding refractive indices of the two layers in the first draw direction is about 0.015 and in the thickness direction is about 0.020. Additional tuning of the indices to further minimize the difference could be obtained by adjusting the draw ratio, rate and/or temperature.

EXAMPLE 5

Example 5 illustrates exemplary materials and process conditions in which a blend of continuous phase and disperse phase materials are used to form a polarizing film. A three layer optical film was used. The three layer film includes a core layer and outer layers on each side of the core layer. The three layer film uses one or more layers of a material, henceforth referred to as a facilitating material, which facilitates processing when coextruded with one or more blend layers. The facilitating material may also provide additional characteristics, e.g. improved mechanical strength, optical properties, or handling. The facilitating material may be used to form either the core layer or the outer layers with the blend material being used to form the other. It is preferred that the facilitating material not substantially affect the polarization orientation of light transmitted through that layer. For this example, the blend material was used to form the outer layers of the film. The facilitating material was used to form the core layer.

Use of a facilitating material to form the core layer may offer versatility in processing and performance relative to the case where the facilitating material is used to form the outer layers in, e.g., a three-layer construction. A wider variety of materials may be used to form the core layer, since some materials which may be preferred for their mechanical properties (improved resistance to tear or fracture) would tend to adhere to the processing equipment if they were used to form the outer layers of the cast sheet.

The shear in the casting die will be the highest at the die wall and the lowest in the center of the extrudate. For the case where the optical blend constitutes the entire thickness of the extruded cast sheet, then the disperse phase particles will tend to be smallest at the die wall and largest in the center. Where one coextrudes a multilayer material, e.g., a three layer film, then the disperse phase particles will be smallest when the optical blend material is used to form the outer layers of the construction. Said differently, when one uses a facilitating material to form the core layer of, for example, a three layer film construction, then, by definition, the core layer will occupy the lowest shear region of the coextrudate, and the disperse phase particles of the optical blend material will preferentially experience the higher shear regions of the coextrudate.

The present invention is not limited to three layer film constructions. For example, one may choose to further refine the anticipated shear rate experienced by the disperse phase particles of the optical blend material by coextruding, for example, a five layer film construction. In this case, the thickness of the outer layers may allow for the control of the extent to which the disperse phase particles elongate in the casting die, particularly in the region immediately adjacent to the die wall. For example, when the diameter of the disperse phase particle in the thickness direction of the final film is less than about $\frac{1}{30}$ the wavelength of light, the film does not scatter light in a manner desirable for the present invention. Hence, control of the dimensions of the disperse phase particles in the extrusion process is desirable.

The outer layers may be sacrificial, in that they may be removed before or after orientation. In this manner, the outer layers may protect the optical blend material from mechanical abrasion (i.e. scratching) or from accumulation of dust and debris. This embodiment of a masking layer or layers has the advantage of being much cheaper than laminating a film of the present invention with yet another film.

The blend material was extruded as a blend of 68.6 weight % coPEN having an IV of 0.57 measured in 60% phenol, 40% dichlorobenzene; 29.1 weight % Questra NA 405 available from Dow Chemical Company; and 2 weight % Dylark 332-80 available from Nova Chemical Company. The facilitating material was a coPET having an IV of 0.65 measured in methylene chloride.

The coPEN was a copolymer based on 70 mole % naphthalene dicarboxylate and 30 mole % dimethylterephthalate and ethylene glycol. The coPET was a copolymer based on 80 mole % dimethylterephthalate and 20 mole % dimethylisophthalate and ethylene glycol.

A first film was made and drawn in only a single direction. The total thickness of the cast sheet of the first film was 810 microns with about one-third of this total in the core layer, and the balance in the outer layers which were approximately equal in thickness. The cast sheet was oriented in the transverse direction only using a conventional tenter. The final transverse draw ratio was approximately 4.3:1 based on the rail settings at the entrance and exit of the tenter. The stretch temperature was 132° C. The heat set temperature was 163° C.

The optical performance of the first film was then measured. The film had an average transmission of 83.6% for wavelengths of light between 400 and 700 nanometers whose polarization orientation was aligned with the pass direction of the film. Light whose polarization orientation was aligned with the block direction of the film had an average transmission of 13.6%. While the film exhibited a reasonable fracture resistance in the direction perpendicular to the draw direction (i.e., the machine direction in this example), when the film was creased in the direction coincident with the transverse direction, the film fractured.

For comparison, reference is made to Example 125 of U.S. Ser. No. 08/610,092 a three layer film made in a manner similar to the first film of this example, except that the blend material was used to form the core layer, and a facilitating material was used to form the outer layers. As in the first film of this example, comparative Example 125 exhibited a reasonable fracture resistance in the direction perpendicular to the draw, and the film fractured when creased in the direction coincident with the transverse direction.

A second film was made of the same materials as in the first film of this example, except that the cast sheet was drawn in the machine direction using a conventional length orienter prior to being drawn in the transverse direction at 127° C. The total thickness of the cast sheet was 1240 microns. The cast sheet was drawn at a ratio of 1.25:1 in the machine direction as described in Example 2. The temperature of roll just prior to the gap was 82° C. The power setting of the infrared heater elements was 100%. The average transmission of light whose polarization orientation was aligned with the pass direction of the drawn film was 81.1%. The average transmission for light whose polarization orientation was aligned with the block direction of the film was 14.8%. The finished film exhibited significantly enhanced mechanical toughness as compared to the uniaxially drawn film. The film did not fracture when creased either along the machine or the transverse direction.

Two additional films were produced and evaluated in a manner consistent with second film described above, except the cast sheet was first drawn at ratios of 1.5:1 and 1.75:1 in the machine direction prior to the transverse direction. The measured respective pass direction transmission values were 80.2% and 78.8%. The respective block direction transmission values were 15.6% and 17%. The films did not fracture when creased either along the machine or the transverse direction.

An additional film was made and evaluated in a manner consistent with the above described films. This film was first oriented 1.35:1 in the machine direction prior to being oriented 4:1 in the transverse direction at 129° C. The measured pass direction transmission value was 83.2%. The block direction transmission value was 15.0%. The film did not fracture when creased either along the machine or the transverse direction.

Aside from significantly enhanced fracture resistance, it was noticed that when films made in accordance with the present invention were stacked and then shear cut using a commercial shear slitter, the films cut cleanly without fracturing, especially when compared to those made in accordance with the comparative Example 125.

It is known that the cross-sectional dimensions of the structures of the disperse phase in the thickness direction of the film are preferably less than or equal to the wavelength of interest, and more preferably less than about 0.5 times the wavelength of interest. Hence within limits, a reduction in the cross-sectional dimensions of the disperse phase leads to an improvement in the optical properties of the optical device. Two additional films were made and evaluated to demonstrate the effect of locating the optical blend material in either the core layer or the outer layers of a three layer construction. The first of the additional films was made in accordance with the first film of this example, in that the optical blend material was used to form the outer layers of a three layer construction. The second of the additional films was made in accordance with comparative Example 125, in that the optical blend material was used to form the core layer of a three layer construction. Cross sections of the cast sheets prior to orientation were evaluated using scanning electron microscopy. Micrographs clearly indicate an increased fibrillation of the disperse phase material of the blend material, particularly when the blend material was used to form the outer layers of the film. One manifestation of fibrillation of the disperse phase material is a reduction in the cross-sectional dimensions in the thickness direction of the film. One method of evaluation is to assess the disperse phase dimensions near or at the center of the film, where the largest particles are to be found. The disperse phase sizes were 0.9 and 1.4 micrometers where the optical blend material formed the outer layers and the core layer of the films, respectively. One would recognize that particles near the outer surfaces of the film construction are smaller than those near the center of the construction.

Furthermore, it was recognized that the blend films of the present invention had a significantly greater surface texture than did those of comparative Example 125. When approximately 1 square meter pieces of film were cut from comparative Example 125, it was difficult to slide one piece over another, e.g. to align one film over another. For the present invention films, they aligned quite easily even when stacked to over 100 sheets high.

EXAMPLE 6

In Example 6, a blend film was constructed in a manner similar to the first film of Example 5 with a cast sheet 515 µm thick. The cast sheet was simultaneously stretched in two orthogonal directions using a laboratory stretcher. The film was stretched in one direction with a stretch ratio of 1.2:1 at strain rate of 0.4%/sec. The film was stretched in the other direction with a stretch ratio of 5.6:1 at a strain rate of 10%/sec. The resultant film exhibited pass direction transmission of 87.6% and block direction transmission of 25.3%. A similar film was stretched but with the strain rate in the first direction being changed to 5%/sec. This film exhibited pass direction transmission of 87.9% and block direction transmission of 27.8%. Each of these films exhibited improved toughness when compared to uniaxially stretched film (e.g., did fracture).

While various examples were provided above, the present invention is not limited to the specifics of the examples. The present invention is applicable to a number of optical films, and materials processes for manufacture thereof. For example, while the above examples generally describe two materials, it will be appreciated that more than two materials can be used. Each material may fall into either an orienting or non-orienting class for a given set of processing conditions. A separate draw process may be used for each material in a film to obtain different desired responses. Various modifications, equivalent processes, as well as numerous materials and products to which the present invention may be applicable will be understood upon review of the present specification. The claims are intended to cover such modifications and devices.

What is claimed is:

1. An optical film, comprising:

a first material having an orientation along each of a first and a second in-plane axis of the film; and a second material coextruded with the first material, the second material having substantial orientation along only the first in-plane axes of the film, the optical orientation of the first and second material being such that refractive indices of the first material and the second material along one of the first and second in-plane axis of the film are substantially equal and the absolute value of the difference between refractive indices of the first and second material along the other of the first and the second in-plane axis divided by the average refractive index of the first and second material is greater than about 0.06.

2. An optical film as recited in claim 1, wherein refractive indices of the first and second material in a direction normal to a plane of the film are substantially equal.

3. An optical film as recited in claim 1, wherein the first and second material are coextruded as a blend with the first material forming a continuous phase of material and the second material forming a disperse phase of material.

4. An optical film as recited in claim 1, wherein the film is comprised of alternating layers of the first and second materials.

5. An optical film as recited in claim 4, wherein refractive indices of adjacent layers of the first and second material in a direction normal to a plane of the film are substantially equal.

6. An optical film as recited in claim 1, wherein the film comprises a blend of the first and second materials.

7. An optical polarizing film, comprising a blend of a disperse phase of a first polymeric material optically interfaced with a continuous phase of a second polymeric material, the second polymeric material having a substantial molecular orientation with respect to a first axis of the film and having a weak, relative to the orientation with respect to the first axis, molecular orientation with respect to a second axis of the film, the first and second polymeric material having refractive indices along one of the first and second axes of the film sufficiently matched to substantially transmit light of a first polarization state while having refractive indices along the other of the first and second axes of the film sufficiently different to substantially reflect light of a second polarization state.

8. A film as recited in claim 7, wherein the second polymeric material has substantial molecular orientation with respect to one of the first and second axes of the film and minimal or no molecular orientation with respect to the other of the first and second axis of the film.

* * * * *